United States Patent
Diamant et al.

(10) Patent No.: US 10,846,201 B1
(45) Date of Patent: Nov. 24, 2020

(54) PERFORMANCE DEBUG FOR NETWORKS

(71) Applicant: Amazon Technologies, Inc., Seattle, WA (US)

(72) Inventors: Ron Diamant, Albany, CA (US); Jindrich Zejda, Saratoga, CA (US); Drazen Borkovic, Los Altos, CA (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/138,396

(22) Filed: Sep. 21, 2018

(51) Int. Cl.
G06F 11/00 (2006.01)
G06F 11/36 (2006.01)
G06F 8/41 (2018.01)
G06N 3/063 (2006.01)
G06F 11/34 (2006.01)

(52) U.S. Cl.
CPC .......... G06F 11/3648 (2013.01); G06F 8/41 (2013.01); G06F 11/348 (2013.01); G06N 3/063 (2013.01)

(58) Field of Classification Search
CPC ..... G06F 11/27; G06F 11/273; G06F 11/2263
USPC .......................................................... 714/30
See application file for complete search history.

(56) References Cited

U.S. PATENT DOCUMENTS

2007/0005202 A1* 1/2007 Breed ..................... G07C 5/008 701/29.1
2010/0198609 A1* 8/2010 Mellin ............... G06Q 10/0639 705/2
2010/0281304 A1* 11/2010 Moyer ................ G06F 11/3648 714/37
2013/0219215 A1* 8/2013 Katz ........................ G06N 5/00 714/26
2014/0032457 A1* 1/2014 Palmer ................... G06N 3/063 706/16
2014/0281057 A1* 9/2014 Cohen ..................... G06F 3/061 710/52

(Continued)

OTHER PUBLICATIONS

Norman P. Jouppi, et al., In-Datacenter Performance Analysis of a Tensor Processing Unit, 44th International Symposium on Computer Architecture (ISCA), Toronto, Canada, Jun. 26, 2017, 17 pages.

(Continued)

Primary Examiner — Sarai E Butler
(74) Attorney, Agent, or Firm — Kilpatrick Townsend & Stockton LLP

(57) ABSTRACT

Disclosed herein are techniques for debugging the performance of a neural network. In one embodiment, a neural network processor includes a processing engine, a debugging circuit coupled to the processing engine, and an interface to a memory device. The processing engine is configured to execute instructions for implementing a neural network. The debugging circuit is configurable to determine, for each instruction in a set of instructions, a first timestamp indicating a start time of executing the instruction and a second timestamp indicating an end time of executing the instruction by the processing engine. The interface is configured to save the first timestamp and the second timestamp for each instruction in the set of instructions into the memory device. The debugging circuit can be configured to different debug levels. The neural network processor can include multiple debugging circuits for multiple processing engines that operate in parallel.

20 Claims, 13 Drawing Sheets

(56) References Cited

U.S. PATENT DOCUMENTS

| | | | |
|---|---|---|---|
| 2014/0289701 A1* | 9/2014 | Hamlin | G06F 8/30 |
| | | | 717/113 |
| 2015/0139249 A1* | 5/2015 | Suzuki | H04L 69/04 |
| | | | 370/474 |
| 2015/0160967 A1* | 6/2015 | Mason | G06F 13/24 |
| | | | 710/267 |
| 2015/0234693 A1* | 8/2015 | Palframan | G06F 11/0751 |
| | | | 714/37 |
| 2015/0309858 A1* | 10/2015 | Weilemann, II et al. | |
| | | | G06F 11/073 |
| | | | 714/47.3 |
| 2016/0124822 A1* | 5/2016 | Remple | G06F 11/221 |
| | | | 714/30 |
| 2017/0083464 A1* | 3/2017 | Potash | G06F 13/4068 |
| 2017/0134258 A1* | 5/2017 | Kumar | H04W 40/24 |
| 2018/0300350 A1* | 10/2018 | Mainali | G06F 16/134 |
| 2018/0314250 A1* | 11/2018 | Lewis | G06N 3/063 |
| 2019/0114533 A1* | 4/2019 | Ng | G06N 3/08 |
| 2019/0155678 A1* | 5/2019 | Hsiong | G06F 11/3006 |
| 2019/0258756 A1* | 8/2019 | Minwalla | G06F 30/20 |

OTHER PUBLICATIONS

Nvidia, Nvidia Cuda C Programming Guide, Version 4.2, Apr. 16, 2012, 173 pages.

* cited by examiner

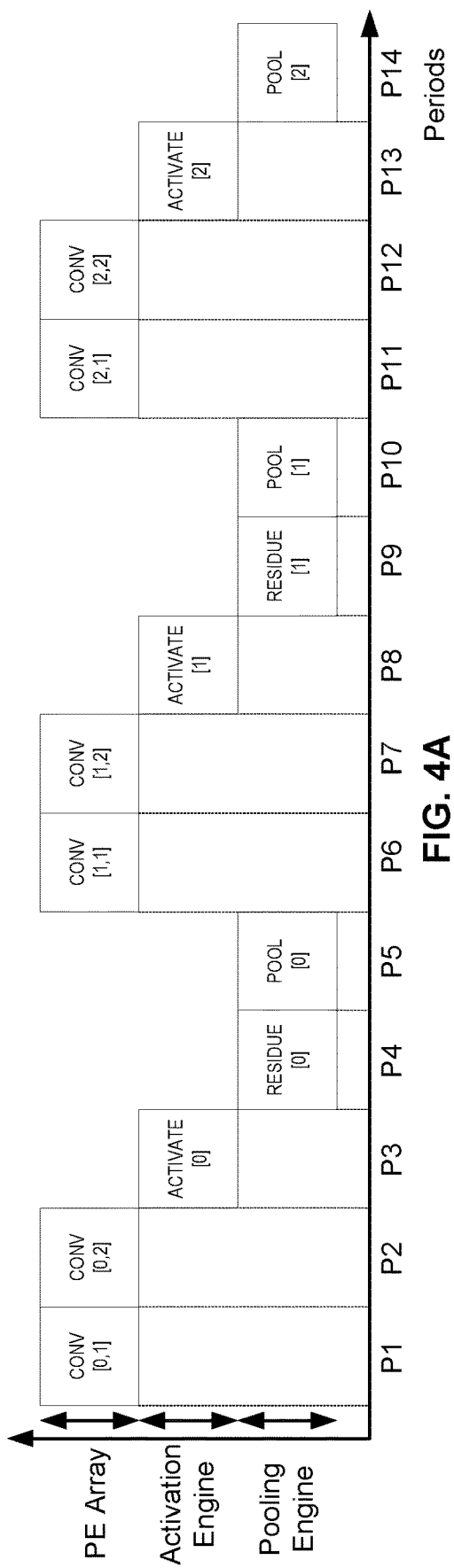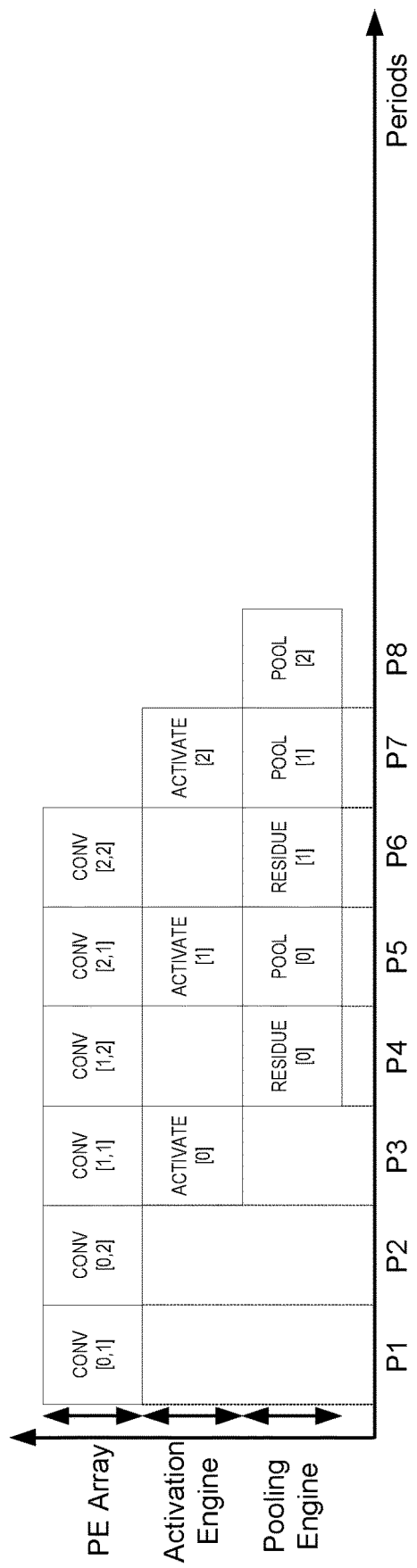
FIG. 4A
FIG. 4B

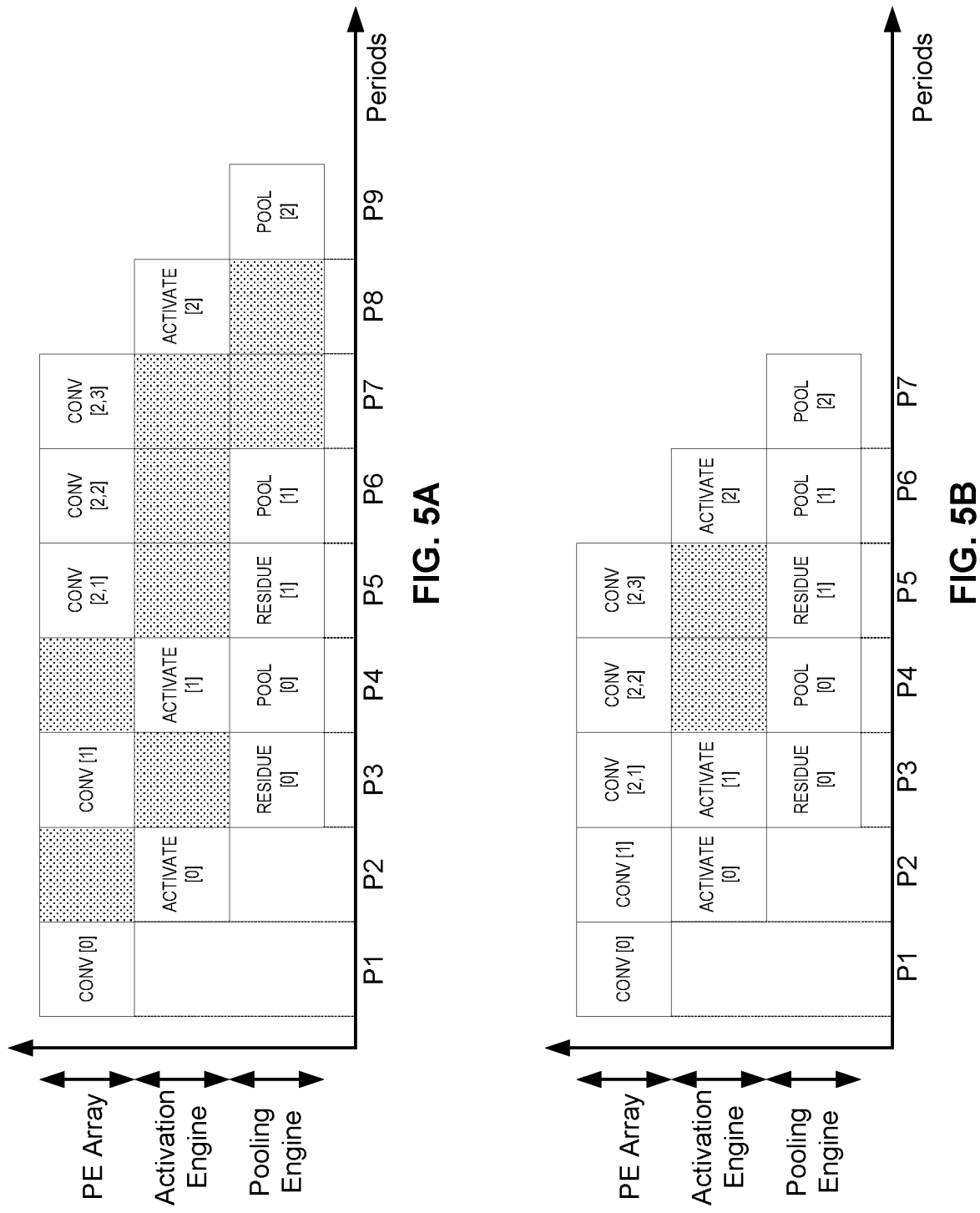

PERFORMANCE DEBUG FOR NETWORKS

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output.

An artificial neural network, such as a deep neural network, may include thousands or more of processing nodes and millions or more of parameters, and thus each inference may include massive computation. For example, in ResNet-50, each inference may include about 8-billion arithmetic operations. In many implementations, in order to improve the performance, the neural network may be configured to perform parallel processing using complex circuits that may include multiple processing units or processing engines. Due to the complexity of the software and hardware of the neural network, it may be very difficult to determine which layer(s), node(s), or operation(s) are the bottlenecks of the neural network in order to further improve the performance of the neural network.

BRIEF DESCRIPTION OF THE DRAWINGS

Various embodiments in accordance with the present disclosure will be described with reference to the drawings, in which:

FIG. 4A illustrates an example of executing instructions in serial in a neural network;

FIG. 4B illustrates an example of using instruction level parallelism to improve the performance of a neural network;

FIG. 5A illustrates an example of using pipelining to improve the performance of a neural network;

FIG. 5B illustrates an example of a pipeline with improved scheduling to improve the performance of a neural network;

DETAILED DESCRIPTION

Figure 1:
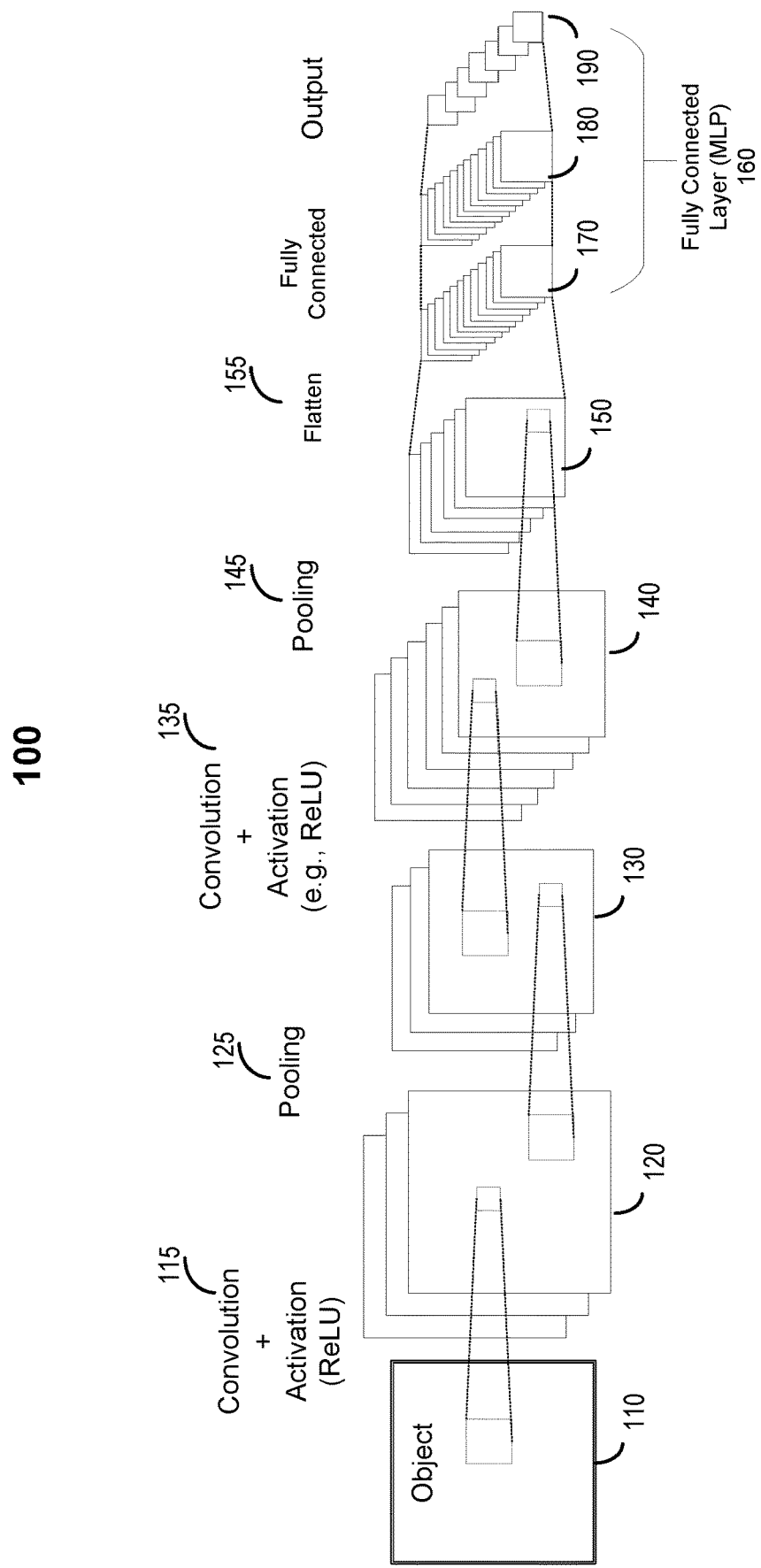
FIG. 1 illustrates an example convolutional neural network (CNN)

Techniques disclosed herein relate generally to debugging a complex computing system, such as neural networks (e.g., deep neural networks). According to certain embodiments, notification packets indicating the starting time and/or the completion time of executing each instruction of a set of instructions by various functional blocks of a neural network are generated and saved using debugging circuits and/or instructions during the operation of the neural network. Based on the saved notification packets, the execution time for each of the instructions may be determined, and possible bottlenecks of the neural network, such as operations that take a long time to perform before other operations can be performed, may be identified. The neural network may then be improved by, for example, modifying the hardware resource of the neural network, assigning operations to different functional blocks, reordering the sequence of the instructions, etc. In some embodiments, the functional blocks of the neural network may be configured to generate the notification packets at different debug levels.

Techniques disclosed herein may be used to track the parallel execution of instructions by multiple processing engines in a pipeline, in multiple threads, or using superscalar techniques. Two timestamps may be generated and saved for each instruction for determining the total execution time of the instruction and/or the start or end time of the instruction relative to other instructions executed by other processing engines. Thus, the dependency between the instructions and the potential software and/or hardware bottlenecks of the neural network may be identified. Because some instructions (e.g., the convolution instructions) may take multiple clock cycles (e.g., 64 to 512 or more) to complete, the bandwidth used for transmitting the timestamps may be very low and the memory space used to store the timestamps may be small. As such, the debugging circuits and/or instructions may have a minimum or negligible impact on the performance of the neural network, and may be used to improve the performance of the neural network by identifying the bottlenecks. In addition, the debugging circuits may be set to different debug levels (e.g., levels of debug verbosity), including a bypass level where no debug output may be generated. Thus, the debugging circuits may be used to optimize the performance of the neural network, and may be turned off after the neural network is optimized to eliminate the impact on the performance of the neural network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Techniques disclosed herein may be used to debug any neural network or any other computing system that may include multiple processing engines or may perform a large number of calculations before yielding a final result, such as a convolutional neural network (also referred to as ConvNets or CNNs). Convolutional neural networks are a type of neural networks that are very effective for applications such as image recognition and classification. For example, CNNs may be used to identify faces, objects, and traffic signs for use in robots and self-driving cars. CNNs may be used in natural language processing tasks (such as sentence classification) as well. A CNN may perform operations including, for example, (1) convolution; (2) non-linearity or activation) function (e.g., ReLU); (3) pooling or sub-sampling; and (4) classification. These operations may be the basic building blocks of every convolutional neural network. Different CNNs may have different combinations of these four main operations. For example, a ResNet-50 network may include 50 network layers that include mostly convolution layers and a few pooling layers. The ResNet network may also perform residue-add operations for residue learning.

The training process and inference process for a neural network (e.g., a CNN) may be performed on hardware, software, or a combination of hardware and software. Training an artificial neural network or using the trained artificial neural network for inference generally requires a significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for the training and/or inference. In various embodiments, the training and inference may be performed on a cloud, on a data center, or on a device.

FIG. 1 illustrates an example convolutional neural network (CNN) 100 for image or other object classification. CNN 100 may include four main operations: (1) convolution; (2) non-linearity (or activation) function (e.g., ReLU); (3) pooling or sub-sampling; and (4) classification (fully-connected layer).

An object 110 to be classified, such as an input image, may be represented by a matrix of pixel values. The input image may include multiple channels, each channel representing a certain component of the image. For example, an image from a digital camera may have a red channel, a green channel, and a blue channel. Each channel may be represented by a 2-D matrix of pixels having pixel values in the range of, for example, 0 to 255 (i.e., 8-bit). A gray-scale image may have only one channel. In the following description, the processing of a single image channel using CNN 100 is described. Other channels may be processed similarly.

As shown in FIG. 1, object 110 (e.g., the input image) may first be processed by a first convolution layer 115 using a first filter, where first convolution layer 115 may perform a convolution between a matrix representing the input image and a matric representing the first filter. The convolution may include multiple matrix multiplication. First convolution layer 115 may also perform a non-linear activation function (e.g., ReLU). An output matrix 120 from first convolution layer 115 may have smaller dimensions than the input image, and may be referred to as the convolved feature, activation map, or feature map. First convolution layer 115 may perform convolutions on the input image using multiple filters to generate multiple output matrices (or feature maps) 120. The number of filters used may be referred to as the depth of the convolution layer. In the example shown in FIG. 1, first convolution layer 115 may have a depth of three. Each output matrix (or feature map) 120 may be passed to a pooling layer 125, where each output matrix 120 may be subsampled or down-sampled to generate a matrix 130.

Matrix 130 may be processed by a second convolution layer 135 using a filter. A non-linear activation function (e.g., ReLU) may also be performed by the second convolution layer 135 as described above. An output matrix 140 (or feature map) from second convolution layer 135 may have smaller dimensions than matrix 130. Second convolution layer 135 may perform convolutions on matrix 130 using multiple filters to generate multiple output matrices (or feature maps) 140. In the example shown in FIG. 1, second convolution layer 135 may have a depth of six. Each output matrix 140 may be passed to a pooling layer 145, where each output matrix 140 may be subsampled or down-sampled to generate a matrix 150.

The two-dimensional output matrices 150 from pooling layer 145 may be flattened to a one-dimensional (1-D) vector by a flatten layer 155, and passed through a fully-connected layer 160 (i.e., a multi-layer perceptron (MLP)). Fully-connected layer 160 may include an input layer 170 that takes the 1-D output vector from flatten layer 155. Fully-connected layer 160 may also include a hidden layer and an output layer 190. Fully-connected layer 160 may classify the object in the input image into one of several categories using feature maps or matrix 150 and, for example, a Softmax function.

The operation of the fully-connected layer may be represented by matrix multiplications. For example, if there are M nodes on input layer 170 and N nodes on hidden layer 180, where the input $X=[x_1, x_2, x_3, \ldots, x_M]$, and the weights of the connections between the M nodes on input layer 170 and the N nodes on hidden layer 180 can be represented by:

$$W = \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix}. \qquad (1)$$

The output Y of hidden layer 180 may be determined by:

$$Y = X \times W = [x_1, x_2, x_3, \ldots, x_M] \times \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix} = [y_1, y_2, y_3, \ldots, y_N]. \qquad (2)$$

When a batch of K samples each including M inputs are received at the fully-connected layer, the inputs may be represented by a K×M matrix for the K samples. The outputs Y of hidden layer 180 may include K×N elements and may be determined by a 2-D matrix multiplication.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to get a final value that represents a single element of an output matrix (e.g., a feature map). A filter may act to detect certain features from the original input image.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters used for the convolution operation. For example, in CNN 100 shown in FIG. 1, three distinct filters are used in first convolution layer 115 to perform convolution operations on the input image, thus producing three different output matrices (or feature maps) 120. Stride is the number of pixels by which the filter matrix is slid over the input pixel array. For example, when the stride is 1, the filter matrix is moved by one pixel at a time. When the stride is 2, the filter matrix is moved by 2 pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 1, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions, such as tan h or sigmoid function, can also be used, but ReLU has been found to perform better in many situations.

Spatial pooling (also referred to as subsampling or downsampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling because the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, etc. In max pooling, the largest element in each spatial neighborhood (e.g., a 1×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

As shown in FIG. 1, CNN 100 may include two or more sets of convolution, activation, and pooling layers, where the second convolution layer 135 may perform convolution operations on the output of pooling layer 125 using six filters to produce a total of six feature maps. The activation operation (e.g., ReLU) may then be applied individually on all of these six feature maps. Next, a max pooling operation may be performed on each of the six rectified feature maps. These convolution, ReLU, and pooling layers may, in combination, extract useful features from an image, introduce non-linearity in the network, and reduce feature dimensions, while making the features equivariant to scale and translation. The output matrices 150 of pooling layer 145 represent high-level features of the input image, and may be used as an input to fully-connected layer 160.

Fully-connected layer 160 may be a multi-layer perceptron. In the fully-connected layer, every node in a layer is connected to every node on the adjacent layer(s). Fully-connected layer 160 may use the high-level features of the input image represented by output matrices 150 to classify the input image into various classes. The fully-connected layer may also be used as a low-cost way to learn the non-linear combination functions of these high-level features. The features from the convolution and pooling layers may be good for the classification task, but non-linear combinations of those features might be even better.

Fully-connected layer 160 may use a Softmax activation function on the output layer. The Softmax function takes a vector of real-valued scores and transforms it into a vector with values (e.g., probabilities) between zero and one that sum to one. Thus, the sum of the output values from the fully-connected layer may be 1. In some embodiments, other classifiers, such as a support vector machine (SVM) classifier, can also be used.

In the example shown in FIG. 1, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 100, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

The total error at the output layer (e.g., the sum over all possible classes) may be calculated by summing the probability errors for all possible classes. For example, the total error may be calculated based on:

$$\text{Total Error} = \tfrac{1}{2}\Sigma(\text{target probability} - \text{output probability})^2, \quad (3)$$

where the target probabilities may include a "1" corresponding to the actual class of the object in the image, and "0s" corresponding to other classes. Techniques such as the backpropagation techniques may then be used to calculate the gradients of the error with respect to parameters and weights to be trained in the network and use the gradient descent to update the parameters and weights to be trained in the network to minimize the output error. The weights may be fine-tuned or adjusted according to their contribution to the total error. When the same training sample is used as the input again, the output probabilities might be closer to the target probabilities, which indicates that the network has learned to classify this particular image. As described above, some parameters of the convolutional neural network, such as the number of filters, filter sizes, architecture of the network, etc., may have been pre-selected and remain unchanged during the training process. The above-described training process may be repeated for all training samples in the training dataset.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

Figure 2:
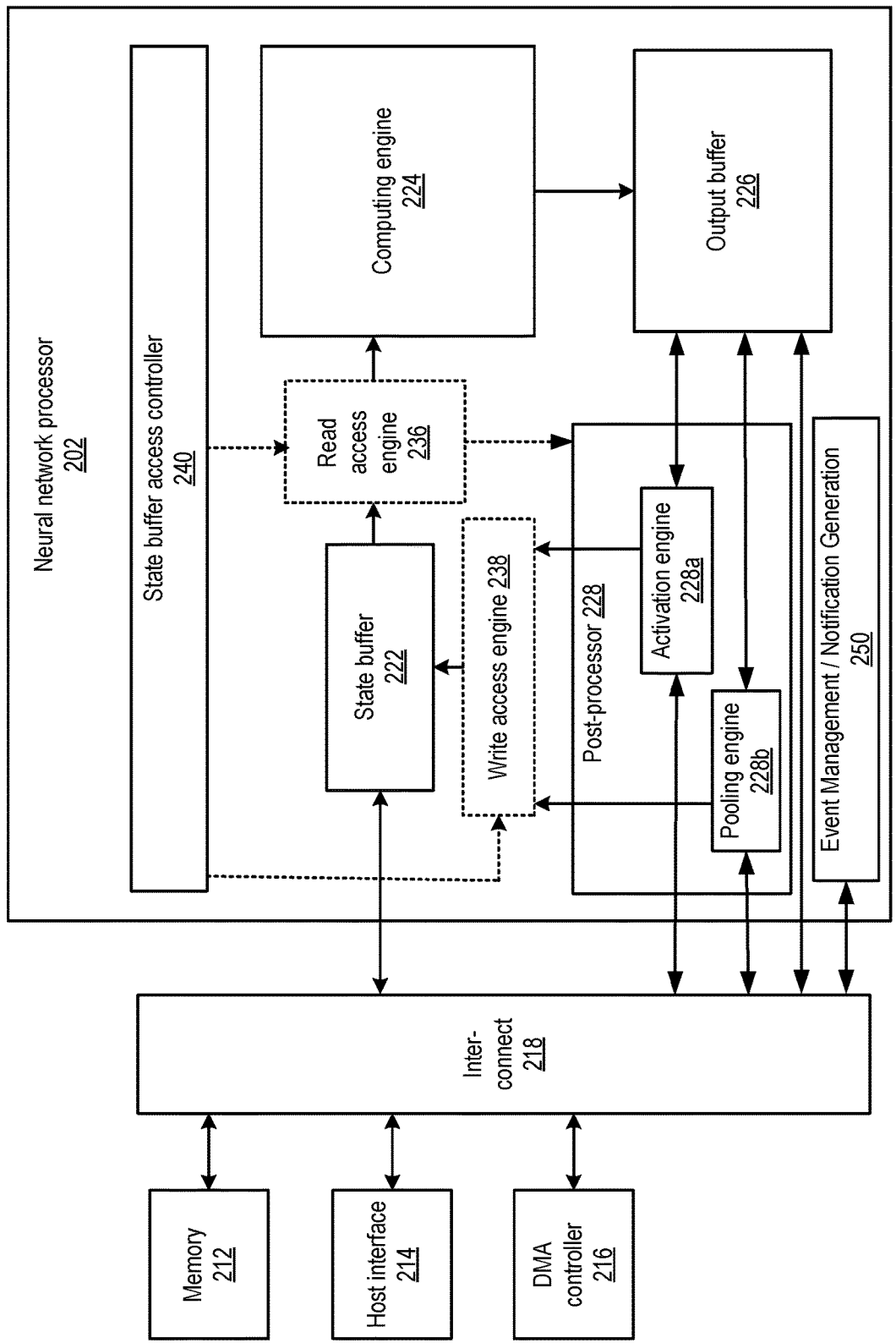
FIG. 2 illustrates an example apparatus for an example artificial neural network.

FIG. 2 illustrates an example apparatus 200 for an example artificial neural network. Apparatus 200 may be part of a computer system, such as a data center server. In some embodiments, apparatus 200 may be part of a multi-tenant compute service system (e.g., a cloud) and may communicate with a host device (not shown in FIG. 2) to provide computing and memory resources for a computing service. Apparatus 200 may include a neural network processor 202 coupled to memory 212, a direct memory access (DMA) controller 216, and a host interface 214 via an interconnect 218. Neural network processor 202 may provide computing resources to support inference using a trained neural network. More detail of the operation of neural network processor 202 is described below.

Memory 212 may be configured to store executable instructions, input data (e.g., pixel data of images), and weights (e.g., the filter parameters) or other parameters of the trained neural network received from, for example, a host device. Memory 212 may also be used to store the output of neural network processor 202 (e.g., one or more image recognition decisions on the input images) or some intermediary data. Memory 212 may include any suitable memory, such as dynamic random access memory (DRAM), synchronous DRAM (SDRAM), double data rate DRAM (DDR DRAM), storage class memory (SCM), flash memory devices, etc.

DMA controller 216 may be configured to perform DMA operations to transfer data between neural network processor 202 and the host device or memory 212. For example, the host device may store the instructions, input data, the weights, and other parameters of the neural network at memory 212. The host device may provide the memory addresses for the stored instructions, data, weights, and other parameters of the neural network to neural network processor 202 (e.g., in the form of memory descriptors). Neural network processor 202 may then obtain the stored instructions, data, weights, or other parameters of the neural network using DMA controller 216 based on the memory addresses provided by the host device. Neural network processor 202 may also store the results of computations (e.g., one or more image recognition decisions or intermediary data) at memory 212, and provide the memory addresses for the stored results to the host device.

Host interface 214 may enable communications between the host device and neural network processor 202. For example, host interface 214 may be configured to transmit the memory descriptors including the memory addresses of the stored data (e.g., input data, weights, results of computations, etc.) between the host device and neural network processor 202. Host interface 214 may include, for example, a peripheral component interconnect express (PCIe) interface or any suitable interface for communicating with the host device.

Neural network processor 202 may provide the computing resources to support the neural network computations for inference, such as image classification. In the example shown in FIG. 2, neural network processor 202 may include an integrated circuit, such as a system-on-chip (SoC), FPGA, or ASIC. Neural network processor 202 may include a number of circuit components, such as a state buffer 222, a computing engine 224, an output buffer 226, and a post-processor 228. In some implementations, neural network processor 202 may also include a read access engine 236 and a write access engine 238 to provide computing engine 242 and post-processor 228 with read and write access to state buffer 222 as discussed in detail below.

State buffer 222 may be configured to provide caching of data used for computations at computing engine 224. The data cached at state buffer 222 may include, for example, the input data and weights obtained from memory 212, output data from computing engine 224, and/or output data from post-processor 228. The caching may reduce the effect of memory access bottleneck (e.g., caused by the latencies at memory 212, DMA controller 216, interconnect 218, etc.) on the performance of computing engine 224. State buffer 222 may be an on-chip memory device and may include, for example, static random access memory (SRAM). In some embodiments, state buffer 222 may be partitioned based on the organization of computing engine 224. For example, state buffer 222 may include multiple SRAM banks, where each bank may be configured to store input data and weights for a row of computing engine 224.

Computing engine 224 may include an array of processing elements (PEs) configured to perform one or more arithmetic operations (e.g., vector multiplication) for neural network computations. In some implementations, computing engine 224 may be a matrix multiplication unit that may be used for matrix convolution and/or matrix multiplication, and thus may be used to implement a convolution layer or a fully-connected layer of the neural network. For example, in some implementations, computing engine 224 may include a systolic array that includes a two-dimensional array of processing elements arranged in rows and columns for matrix multiplication. In some implementations, computing engine 224 may include circuits for quantizing input data before performing the arithmetic operations (e.g., from floating point numbers to integer numbers) so as to reduce the complexity of the arithmetic operations.

Post-processor 228 may be configured to perform post-processing on the outputs of computing engine 224 that may be stored in output buffer 226. In the example shown in FIG. 2, post-processor 228 may include an activation engine 228a and a pooling engine 228b. Activation engine 228a may perform one or more activation (non-linear) functions, such as tan h, sigmoid, ReLU, etc., on the outputs of a convolution layer to generate the output data, and store the output data in state buffer 222. In some implementations, activation engine 228a may also include one or more multiplier circuits. In some implementations, activation engine 228a may also perform de-quantization between layers. Pooling engine 228b may perform, for example, maximum pooling, average pooling, etc., on the outputs of a convolution layer or activation engine 228a to generate subsamples, and store the subsamples in state buffer 222. In some implementations, pooling engine 228b may also include one or more multiplier circuits. In some implementations, pooling engine 228b may also perform residue-add for residual learning (e.g., to implement a ResNet) or other arithmetic logic operations. Pooling engine 228b and/or activation engine 228a may also be controlled to be skipped for certain convolution layers. For example, as discussed above, a CNN may perform multiple convolution and ReLU operations before performing a pooling operation.

In some implementations, post-processor 228 may also include a Softmax engine (not shown in FIG. 2) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 236 may provide read access to state buffer 222 for a read access requesting device including, for example, computing engine 224 and post-processor 228. Write access engine 238 may provide write access to state buffer 222 for a write access requesting device including, for example, post-processor 228. Each of read access engine 236 and write access engine 238 may convert a sequential series of access operations (e.g., multiple read or write operations across multiple clock cycles) to a single access operation to reduce power and reduce wait latency. Each of read access engine 236 and write access engine 238 may be organized based on state buffer 222. For example, each of read access engine 236 and write access engine 238 may include multiple sub-engines corresponding to multiple SRAM banks of state buffer 222, with each sub-engine providing access to a corresponding SRAM bank. A sub-engine of read access engine 236 may convert a sequential series of read access operations to a corresponding SRAM bank for multiple data elements (e.g., by a row of computing engine 224 or by post-processor 228) to a single read access for the multiple data elements. A sub-engine of write access engine 238 may also convert a sequential series of write accesses for storing multiple data elements at the corresponding SRAM bank (e.g., by post-processor 228) to a single write access for the multiple data elements.

In some embodiments, neural network processor 202 may also include a stream processor (not shown in FIG. 2) that handles the parallel processing and coordinates the operations of the different processing engines in neural network processor 202.

In some embodiments, neural network processor 202 may also include an event management and notification generation unit 250. Events may be used to enforce dependencies or ordering between instructions running on different engines, which may be synchronized or not synchronized. For example, event management and notification generation unit 250 may manage events for synchronizing DMA data movement, processing engine execution, software breakpoints, etc., and/or generate notification packets that include information for debug purposes.

One or more neural network processors 202 may be used to implement a deep neural network that may include multiple sets of convolution, activation, and pooling layers. For example, a neural network processor 202 may first receive input data and instructions for implementing a first set of convolution, activation, and/or pooling layers. The input data may include the network parameters for the first set of network layers, such as the number of nodes, the weights, or the parameters of the filters, etc. The input data may also include the external input data to be processed by the neural network or intermediate output data from previous layers of the neural network. The instructions may include instructions for computing engine 224, activation engine 228a, and/or pooling engine 228b. After the input data are processed by the first set of network layers, new input data and instructions for implementing a second set of convolution, activation, and/or pooling layers may be received by neural network processor 202. The new input data may include parameters for the second set of network layers and intermediate output data from the previous layers, and the new instructions may include the instructions to be executed by the processing engines to implement the second set of network layers. In this way, a neural network processor 202 may be used to implement multiple sets of network layers. As such, a deep neural network (e.g., a ResNet-50 network with 50 layers) may be implemented using a smaller number (e.g., 1, 2, 4, or 8) of neural network processors.

A neural network that has been trained may be represented by a neural network model that may describe the network architecture (e.g., layers and connection between nodes on the layers) and various parameters associated with the neural network. The neural network model may be a functional model described in a higher level programming language or hardware description language, such as C, C++, C #, Java #, python, R, Haskell, D, Ocaml, LISP, MatLab, etc. The neural network model may be compiled by a compiler to generate executable instructions. The compiler may convert a neural network model into machine-executable instructions, such as binary instructions, that may be executed by various functional blocks (e.g., processing engines) of the neural network. The compiler may manage the allocation of different operations of the neural network to various hardware resources (e.g., processing engines), the allocation of memory for storing neural network parameters and intermediate data, and the timing and synchronization conditions between the various hardware resources. For example, the compiler may assign an multiplication operation to a PE array or an activation engine.

In some embodiments, the compiler may maintain a list of available hardware resources and the functions and usage of the hardware resources of the neural network, and assign operations of the neural network to appropriate hardware resources based on the functions and usage of the hardware resources. The compiler may specify the source memory address where the input data for an operation may be stored, and allocate memory space for storing the output data for the operation. The compiler may also determine the order of the operations to be executed by the various processing engines.

The compiler may manage the synchronization between the processing engines. For example, the compiler may determine that a second operation by a processing engine may not start until the completion of a first operation by another processing engine, such as after the output data of the first operation has been written into a memory device.

The compiler may generate executable instructions to be executed by the processing engines. In some embodiments, one set of instructions may be generated for each respective processing engine. The instructions may include machine readable and executable code, such as binary code. The instructions may include certain timing for the instructions, such as the wait time between two instructions or the conditions to be met before starting an instruction. During run time, the instructions may be loaded into the respective instruction buffers for the processing engines and executed by the processing engines.

According to certain embodiments, generating the executable instructions for the processing engines may include determining the debugging level for each operation or instruction. For example, the compiler may determine that, for some operations or instructions, no debugging may be needed, and, for some other operations or instructions, debugging may be performed at the start and/or end of each operation. In some embodiments, the compiler may set certain fields in the header of an instruction to indicate the desired debug level for the instruction.

Figure 3:
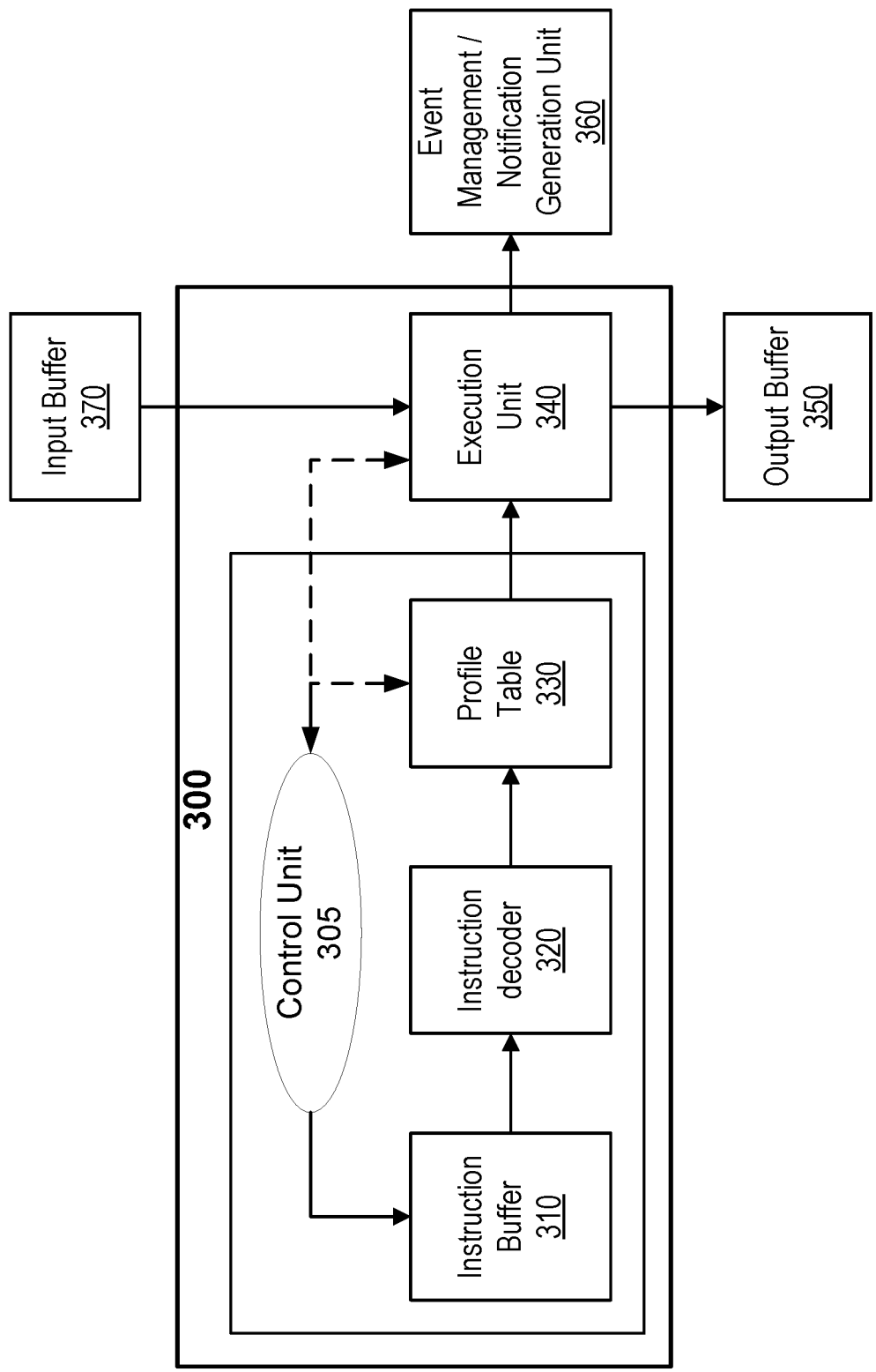
FIG. 3 is a simplified block diagram of an example of a processing engine.

FIG. 3 is a simplified block diagram of an example of a processing engine 300. Processing engine 300 may be, for example, a convolution engine, an activation engine, or a pooling engine as described above with respect to FIG. 2. Processing engine 300 may include a control unit 305 that may control the operations of processing engine 300. For example, control unit 305 may determine when the execution of a previous instruction has been completed and a new instruction can now be executed. Processing engine 300 may include an instruction buffer that stores instructions to be performed by the processing engine. The instruction buffer may store, for example, 16, 32, 64 or more instructions. Processing engine 300 may include an instruction decoder 320 that may convert instructions into operational codes (opcodes) or functions of particular hardware circuits. When control unit 305 determines that a new instruction can now be executed by the processing engine, the control unit may cause instruction decoder 320 to get an instruction from instruction buffer 310 and decode the instruction into opcodes. The opcodes may be used to access profiles from a profile table 330. Opcodes may be executed by an execution unit 340, such as a PE array. Execution engine may obtain parameters for the processing engine and the input data from, for example, an input buffer 370 (such as state buffer 222 described above). The output from execution unit 340 may be sent to an output buffer 350, such as output buffer 226. In some embodiments, execution unit 340 may send some information (e.g., for debug purposes, such as metadata) to an event management and notification generation unit 360 (such as event management and notification generation unit 250), which may generate notification packets based on the information from execution unit 340 as described in detail below.

In neural networks, some instructions may each take multiple clock cycles (e.g., from about 64 to about 512 cycles) to complete, which may reduce the bus (e.g., PCI/DRAM bus) bandwidth used for moving instructions into the processing engines. For example, the average clock cycles per instruction may be on the order of 100, and the bandwidth used to load the instructions may be less than 0.25 GB per second.

In order to achieve a high performance, it is generally desirable that the PE array in compute engine is maximally utilized during the operation of the neural network because a high percentage (e.g., >98%) of the computational operations of the neural networks is the multiply-and-add operations, which are generally performed in the PE array. Thus, keeping the PE array maximally utilized at all times may maximize the performance of the neural network processor. Maximally utilizing the PE array may be achieved through, for example, instruction level parallelism, in order to perform all non-PE-array instructions in parallel to the PE-array instructions.

FIG. 4A illustrates an example of executing instructions in serial using a neural network processor, such as neural network processor 202. As shown in FIG. 4A, the PE array in computing engine 224 may execute convolution instructions CONV[0,1] and CONV[0,2] for a first convolution operation in periods P1 and P2. After the first convolution operation is completed by the PE array, an activation engine of the neural network processor may start to execute an activation instruction ACTIVATE[0] in period P3. After the activation instruction ACTIVATE[0] is completed, the pooling engine of the neural network processor may start to execute a residue-add instruction RESIDUE[0] in period P4 and a pooling instruction POOL[0] in period P5. Similarly, a second set of instructions for convolution, activation, residue-add, and pooling operations may be executed sequentially by the processing engines in periods P6 to P10. A third set of instructions for convolution, activation, and pooling operations may be executed sequentially by the processing engines in periods P11 to P14. Thus, the 14 instructions shown in FIG. 4A may be executed in 14 periods, where the duration of each period may be different.

FIG. 4B illustrates an example of using instruction level parallelism to improve the performance of a neural network. As shown in FIG. 4B, the PE array in computing engine 224 may perform convolution instructions CONV[0,1] and CONV[0,2] for a first convolution operation in periods P1 and P2. After the first convolution operation is completed by the PE array, the activation engine of the neural network processor may start to execute activation instruction ACTIVATE[0] in period P3. At the same time, the PE array may start to execute convolution instruction CONV[1,1] in period P3 for the second convolution operation. In period P4, the pooling engine may execute residue-add instruction RESIDUE[0], and the PE array may execute convolution instruction CONV[1,2] for the second convolution operation. In period P5, the pooling engine may execute the first pooling function POOL[0], the activation engine may execute the second activation instruction ACTIVATE[1], and the PE array may execute convolution operation CONV[2,1] for the third convolution operation. In period P6, the PE array may execute convolution operation CONV[2,2] for the third convolution operation, and the pooling engine may executed residue-add instruction RESIDUE[1]. In period P7, the pooling engine may execute the second pooling function POOL[1], the activation engine may execute activation instruction ACTIVATE[2]. In period P8, the pooling engine may execute the third pooling function POOL[2]. In this way, the 14 instructions shown in FIG. 4A may be executed in 8 periods.

There may be several techniques to achieve the instruction level parallelism, such as, for example, multi-threading, pipelining, and superscalar processing. Pipelining may use a fixed latency between the different stages (e.g., dictated by the worst-case latency), enforce strict ordering between stages, and may incur certain inefficiencies (e.g., pipeline bubbles).

FIG. 5A illustrates an example of using pipelining to improve the performance of a neural network. In period P1, the PE array in computing engine 224 may execute a convolution instruction CONV[0] for a first convolution operation. In period P2, the PE array may be idle while the activation engine of the neural network processor executes a first activation function ACTIVATE[0]. In period P3, the pooling engine of the neural network processor may start to execute a residue-add instruction RESIDUE[0], and the PE array may execute a convolution instruction CONV[1] for a second convolution operation. The activation engine may be idle in period P3. In period P4, the pooling engine may execute the first pooling function POOL[0], while the activation engine may execute a second activation function ACTIVATE[1]. The PE engine may be idle in period P4. In period P5, the pooling engine may execute a second residue-add instruction RESIDUE[1], while the PE engine may execute convolution function CONV[2,1] for a third convolution operation. The activation engine may be idle in period P5. In period P6, the pooling engine may execute a pooling function POOL[1], while the PE engine may execute a second convolution function CONV[2,2] for the third convolution operation. The activation engine may still be idle in period P6. In period P7, the PE engine may execute a third convolution function CONV[2,3] for the third convolution operation, while the activation engine and the pooling engine may be idle. In period P8, the activation engine may execute a third activation function ACTIVATE[2], while the PE array and the pooling engine may be idle. In period P9, the pooling engine may execute a third pooling function POOL[2], and the PE array and the activation engine may be idle. Thus, the 13 instructions shown in FIG. 5A may be executed in 9 periods, where the duration of each period may be different. There may be many periods in which the PE array, the activation engine, or the pooling engine is idle.

FIG. 5B illustrates an example of a pipeline with improved scheduling to improve the performance of a neural network. In the example, there may be no idle periods for the PE array and the pooling engine. Thus, the PE array may be fully utilized. For example, in period P1, the PE array may execute convolution instruction CONV[0]. In period P2, the PE array may continue to execute another convolution instruction CONV[1], while the activation engine may execute activation instruction ACTIVATE[0]. In period P3, the PE engine may execute convolution instruction CONV[2,1], while the activation engine may execute activation instruction ACTIVATE[1] and the pooling engine may execute instruction RESIDUE[0] during the same time period. In period P4, the PE engine may execute convolution instruction CONV[2,2], while the pooling engine may execute instruction POOL[0] during the same time period. In period P5, the PE engine may execute convolution instruction CONV[2,3], while the pooling engine may execute instruction RESIDUE[1] during the same time period. In period P6, the activation engine may execute activation instruction ACTIVATE[2] and the pooling engine may execute instruction POOL[1]. In period P7, the pooling engine may execute instruction POOL[2]. In this way, the 13 instructions can be executed in 7 periods, and there may be no idle time period for the PE array. Thus, the overall performance of the neural network may be improved.

In the multi-threading technique, each processing engine may run its own set of instructions. In the superscalar technique, a single set of instructions may be sequenced to different processing engines. To reduce hardware complexity, the multi-threading technique may be selected over the superscalar technique. The compiler may generate a set of instructions for each respective processing engine, such as the PE-array, activation engine, or pooling engine, and the processing engines may execute the sets of instructions synchronously or asynchronously, where the execution of the instructions by the different processing engines may be coordinated through events as described in detail below. The asynchronous execution of the instructions by the different processing engines may allow fine-grained software control and enable weight-loading (to the PE array) and matrix-multiplication (by the PE array) in parallel.

Figure 6:
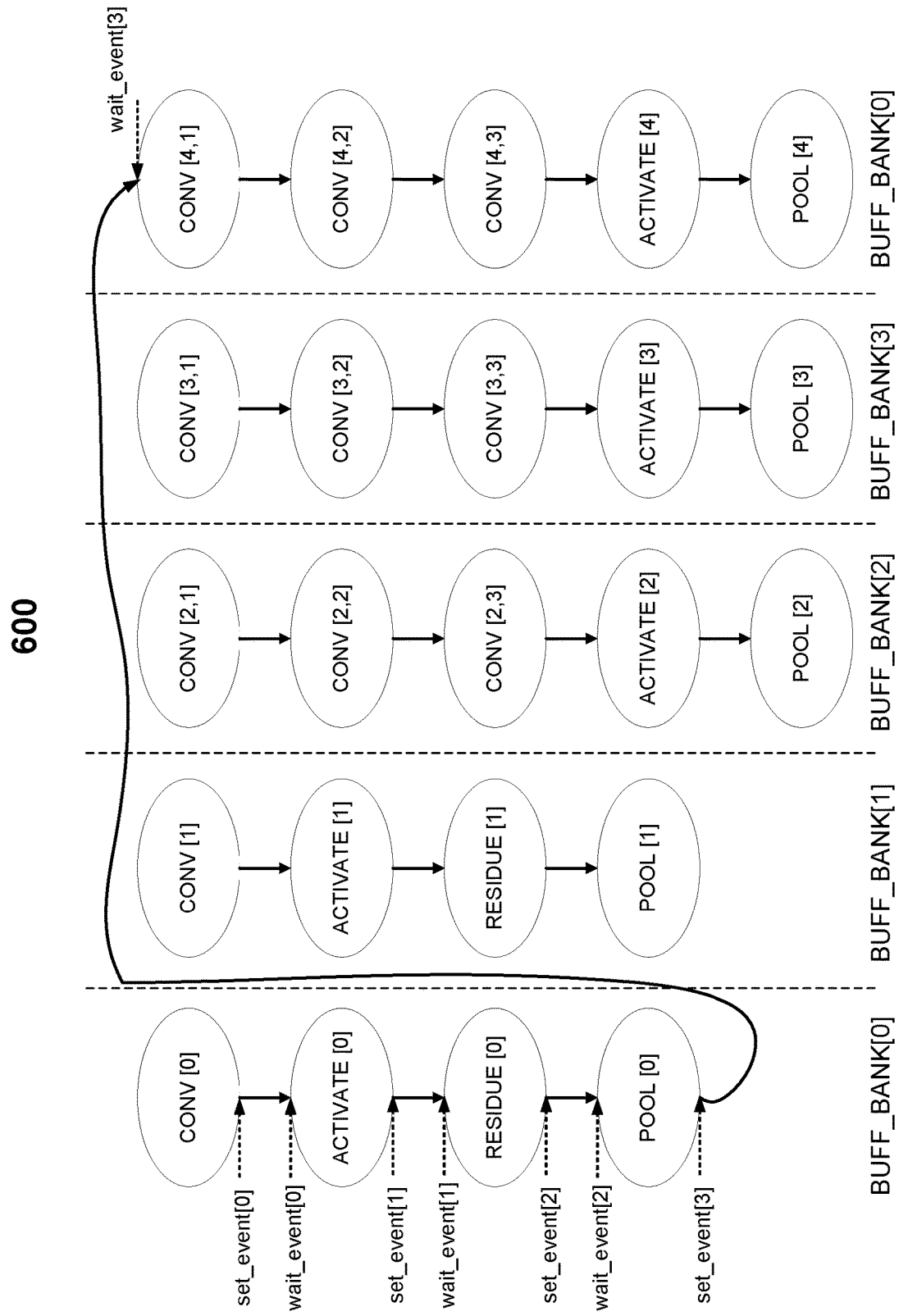
FIG. 6 illustrates an example of using multi-threading to improve the performance of a neural network.

FIG. 6 illustrates an example of using multi-threading to improve the performance of a neural network. Each processing engine may perform its own set of instructions in serial. For example, the convolution engine (e.g., the PE array) may execute convolution instructions CONV[0], CONV[1], CONV[2,1], CONV[2,2], CONV[2,3], CONV[3,1], CONV[3,2], CONV[3,3], CONV[4,1], CONV[4,2], and CONV[4,3] in serial. Similarly, the activation engine may execution activation instructions ACTIVATE[0], ACTIVATE[1], ACTIVATE[2], ACTIVATE[3], and ACTIVATE[4] in serial.

In the example shown in FIG. 6, there is no implicit dependency between instructions executed on different processing engines, and each processing engine may execute its instructions in serial. The order of the execution of the instructions by the different processing engines may only be enforced when there is a data or resource dependency between the instructions. Thus, the pipeline bubbles (idle time) as shown in FIGS. 4A-5B may be reduced or avoided. The order of the execution of the instructions by the different processing engines, when needed, may be enforced through events.

For example, there may be data dependency between instruction CONV[0] and instruction ACTIVATE[0] because instruction ACTIVATE[0] may use data generated by instruction CONV[0]. In addition, instructions in each column shown in FIG. 6 may use a same bank in an output buffer of the neural network processor, such as output buffer 226 of neural network processor 202. Thus, the instructions in each column shown in FIG. 6 may have both data dependency and resource dependency. In addition to instructions CONV[0], ACTIVATE[0], RESIDUE[0], and POOL [0] in the first column of FIG. 6, instructions CONV[4,1], CONV[4,2], CONV[4,3], ACTIVATE[4], and POOL[4] in the fifth column in FIG. 6 may also use bank [0] in output buffer 226 of neural network processor 202. Thus, even if there is no data dependency between instruction POOL[0] and instruction CONV[4,1], there is a resource dependency between instruction POOL[0] and instruction CONV[4,1].

As shown in FIG. 6, to enforce the data or resource dependency, an event event[0] may be set after the execution of instruction CONV[0] by the PE array, and the activation engine may wait for event[0] before starting to execute instruction ACTIVATE[0]. Similarly, an event may be set after the execution of each instruction in column 1, and each subsequent instruction may be started after the event has been set. In addition, the PE array may wait for an event (e.g., event[3]) set after the instruction POOL[0] is executed by the pooling engine, before starting to execute convolution instruction CONV[4,1], in order to avoid corrupting data in bank[0] that may be used or generated by the pooling engine when executing instruction POOL[0].

As described above, a neural network may include multiple processing engines and each processing engine may run independently in multiple threads to perform millions or billions of arithmetic operations that may have data or resource dependency. In many cases, the software (e.g., instructions) and hardware of the initially implemented neural network may not be optimized and thus the performance (e.g., speed) of the neural network may not be as high as desired. Because of the large circuitry, the large amount of computation performed by the neural network, and the parallel execution of different operations by different processing engines, it may be difficult to accurately identify the software instructions or hardware circuits that may be the bottlenecks of the neural network or may cause the lower than desired performance of the neural network.

According to certain embodiments, debugging circuits and/or instructions configured to record the starting time and/or the end time of the execution of each individual instruction by a corresponding processing engine may be added to the neural network. During the operation of the neural network, notification packets including the starting time and/or the end time of each instruction may be generated and saved to a memory device. The timelines of the execution of the corresponding instructions by the processing engines may be generated and/or visualized, and may be used to identify the bottlenecks of the neural network, such as a long latency of certain instructions, an idle time period of the PE array, etc. The software and/or hardware of the neural network may then be modified to improve the performance of the neural network at the identified bottlenecks. Because each instruction may take multiple cycles to complete and the start time and end time of each instruction may be recorded by separate debugging circuits (rather than using the processing engine), recording and saving the start time and end time of each instruction may use minimum hardware resources and bus bandwidth, and thus would have a minimum negative impact on the performance of the processing engine.

Figure 7:
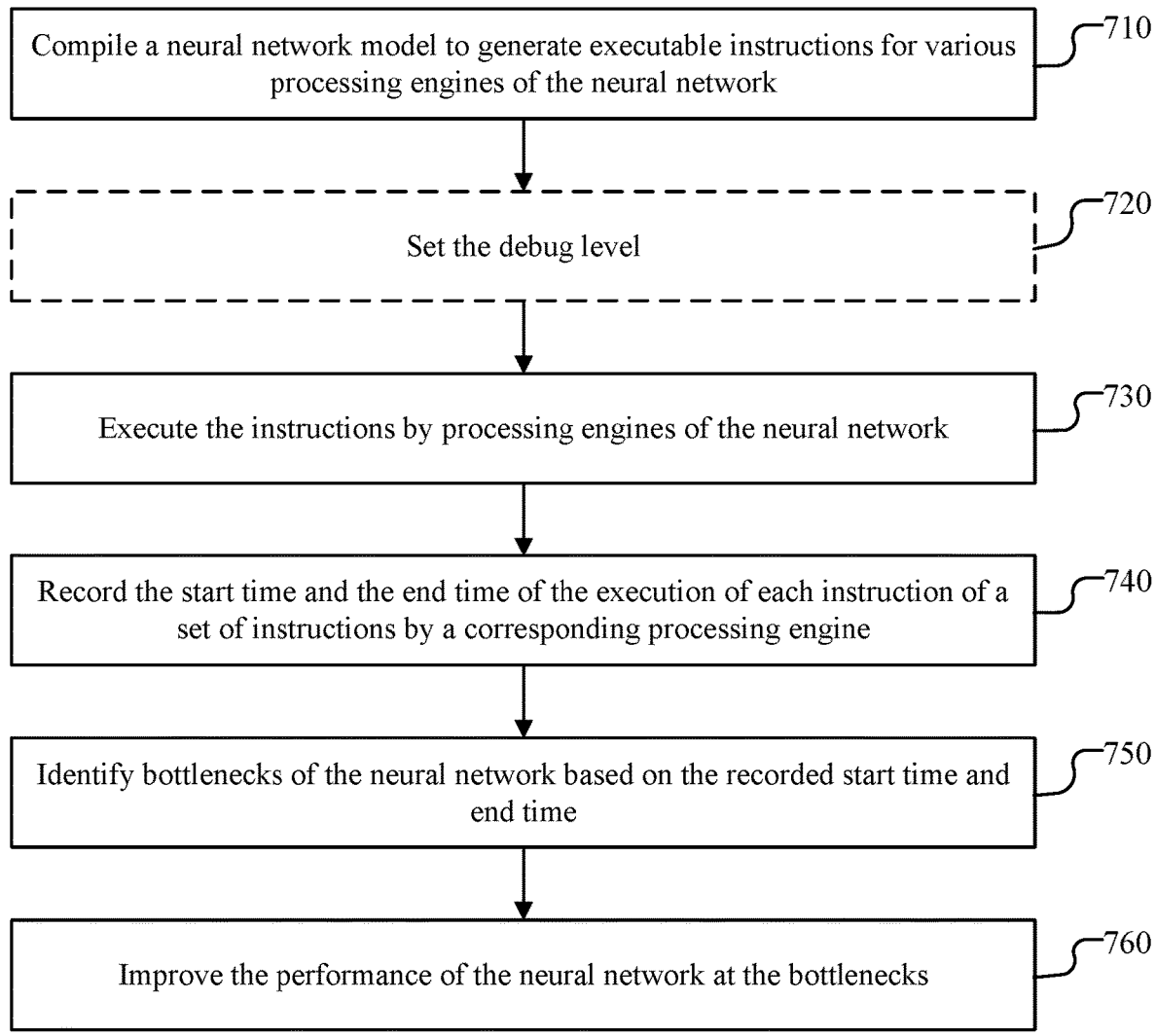
FIG. 7 illustrates an example process for monitoring and debugging the performance of a neural network according to certain embodiments.

FIG. 7 illustrates an example process 700 for monitoring and debugging the performance of a neural network according to certain embodiments. Debugging circuits and/or instructions may be added to the neural network to record the execution time of various instructions. At block 710, a compiler may compile a neural network model to generate executable instructions. The compiling may include, for example, determining the processing engine used to perform an operation (e.g., convolution, polling, activation, multiplication, etc.), determining memory locations for storing various data for the neural network (e.g., input data to the neural network and parameters of the neural network, such as weights or filters parameters), determining the order of operations by different processing engines, and determining the relative timing of the operations. For example, instructions for setting events after the completion of an instruction and/or waiting for an event before starting an instruction may be added by the compiler to enforce the order of operation when needed. The executable instructions may be stored in a memory device and may be read by the various processing engines into corresponding instruction buffers for executing by the processing engines.

Optionally, at block 720, a desired debug level may be set for the neural network by configuring the debugging circuits. For example, the debugging circuits may include a timestamp generator that may be configurable to record or trigger the recording of the start time and/or the end time of the execution of an instruction. The debugging circuits may be configured to a desired debug level by setting the appropriate bits in control registers. For example, in some cases, the debugging circuits may be turned off or bypassed. In some cases, the debugging circuits may be set to generate a debug output (e.g., a notification packet) for each instruction. The debugging circuits may alternatively be set to generate debug outputs for only certain instructions (e.g., determined by a compiler). The debug output may be generated at the start of an instruction (e.g., the start timestamp), at an end of an instruction (e.g., the end timestamp), or both. In some embodiments, the debug level for a processing engine of the neural network may be individually specified for each respective instruction by, for example, the compiler.

At block 730, the neural network, more specifically, the processing engines of the neural network may execute the executable instructions. Each processing engine may be configured to execute a subset of the executable instructions. In some embodiments, the processing engines may be coordinated based on events as described above with respect to, for example, FIG. 6. For example, an activation engine may be controlled to wait for the completion of an instruction by a convolution engine before starting an activation operation that uses the output of the convolution engine.

At block 740, while the processing engines execute the instructions, the debugging circuits associated with the processing engines may generate debug outputs (e.g., timestamps) for the instructions. The debug outputs may be saved in a memory device, such as a DRAM or solid state drive, through a memory interface. As described above, depending on the debug level set for the debugging circuits, one or more debug outputs may be generated and saved for some or all instructions, where the debug outputs, such as the timestamps, may be included in notification packets. In some embodiments, the timestamps may be generated based on a global reference clock or a global clock counter that counts the number of clock cycles since a reference point (e.g., the start of an inference or a reset of the clock counter). For example, the debugging circuit may trigger the recording of the counter value of the global clock counter at the beginning or end of an instruction. In some embodiments, the processing engines are synchronized and the timestamps may be generated in each processing engine based on a local clock or clock counter.

At block 750, based on the recorded start time and/or end time of each instruction performed by the corresponding processing engine, timelines may be generated for the processing engines and may be used to identify the bottlenecks of the neural network. The timelines may be generated and aligned based on a global reference clock (or a clock counter). Based on the timelines, bottlenecks of the neural network, such as the instructions that may have an execution time or a latency longer than expected and/or processing engines that execute these instructions, or instructions associated with a lower than expected utilization rate of the processing engines, may be identified.

At block 760, the software and/or hardware of the neural network may be modified to improve the performance of the neural network at the identified bottlenecks. For example, the compiler may recompile the neural network to generate optimized instruction sets to change the assignment of the network operations to the processing engines, change the order of the execution of the instructions, or change the network hardware resource that may be associated with the bottlenecks.

Figure 8:
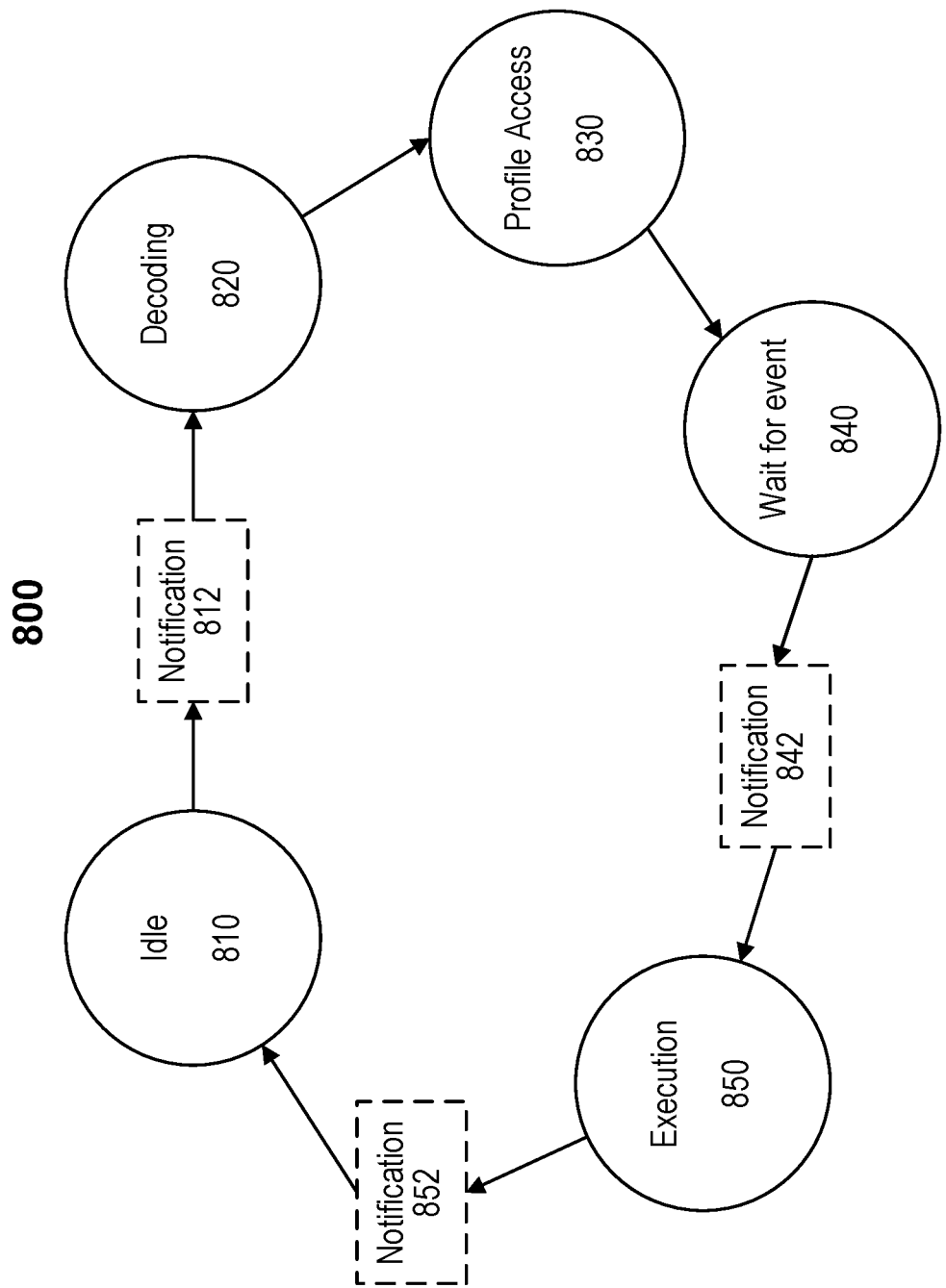
FIG. 8 illustrates an example of a state machine for controlling a processing engine of a neural network according to certain embodiments.

FIG. 8 illustrates an example of a state machine 800 for controlling a processing engine of a neural network according to certain embodiments. State machine 800 may be executed by control unit 305 to control the operation of any processing engine, such as computing engine 224, activation engine 228*a*, or pooling engine 228*b*. State machine 800 may include an idle state 810, in which no instructions may be executed by the processing engine. In a decoding state 820, a decoder, such as instruction decoder 320, may receive the next instruction to be executed by the processing engine from an instruction buffer (e.g., instruction buffer 310), and decode the instruction to generate opcodes for the execution unit (e.g., a PE array) in the processing engine. In a profile access state 830, the profile for the instruction, such as the parameters (e.g., weights or filter parameters) for the network layer, may be accessed from, for example, a memory device or a state buffer (e.g., state buffer 222). In a wait-for-event state 840, the processing engine may wait for an event (e.g., the completion of another instruction) to be set before performing the opcodes by the execution unit (e.g., the matrix multiplication). In an execution state 850, the execution unit of the processing engine may execute the opcodes, such as performing the matrix multiplication by a PE array.

According to certain embodiments, a notification 812 may be generated when state machine 800 leaves idle state 810, for example, when a new instruction is read from the instruction buffer by an instruction decoder. The notification may be generated by a debugging circuit in a control unit, such as control unit 305. The notification may include a timestamp indicating the time when the instruction is fetched from the instruction buffer. For example, the timestamp may include a clock counter value at the time the instruction is fetched. Another notification 852 may be generated when the state machine transitions from execution state 850 to idle state 810 (e.g., after the completion of the execution). The generation of the notification may be triggered by the control unit, and the notification may be generated by a debugging circuit based on the current value of the clock counter. The time difference between notification 812 and notification 852 may indicate the total time during which the processing engine is used to perform an instruction, including the memory access time, the wait time, and the actual execution time of the opcodes by the execution unit of the processing engine. Because the memory access time, the wait time, and the actual execution time may be different for each instruction, the total time to perform an instruction may be different for different instructions. In some embodiments, a notification 842 may be generated after an event that would trigger the execution of the instruction by the execution engine has occurred. The time difference between notification 812 and notification 842 may indicate the memory access time and/or the wait time, while the time difference between notification 842 and notification 852 may indicate the actual execution time of the execution unit. The timestamp associated with each notification (e.g., notification 812, 842, or 852) may be included in a notification packet, which may include other information associated with the instruction. The notification packet may be saved to a memory device, such as memory 212, through a memory interface. In some embodiments, the notification packets for the various processing engines in the neural network may be generated by, for example, event management and notification generation unit 250 and saved to memory 212 through interconnect 218.

Figure 9:
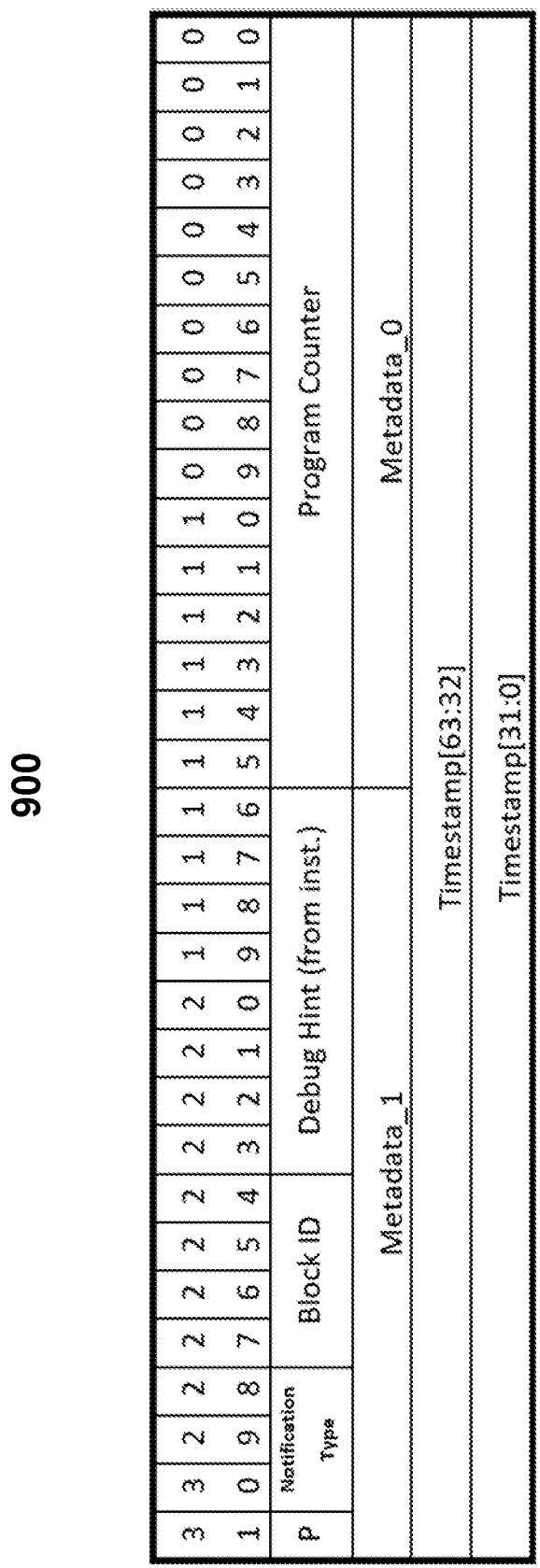
FIG. 9 illustrates an example of a notification packet for monitoring the performance of a neural network according to certain embodiments.

FIG. 9 illustrates an example of a notification packet 900 for monitoring the performance of a neural network according to certain embodiments. In the example shown in FIG. 9, notification packet 900 includes 16 bytes. Notification packet 900 may include a "Notification Type" field that specifies the type of notification. For example, a "4" in the "Notification Type" field may indicate that the notification is generated at the start of an instruction, and a "5" in the "Notification Type" field may indicate that the notification is generated at the end of the instruction. Notification packet 900 may also include a "Block ID" field that indicates the processing engine associated with the debugging circuit that generates the notification packet or the processing engine that executes the instruction, such as the convolution engine (or PE array), the activation engine, or the pooling engine. Notification packet 900 may include software (e.g., compiler) generated metadata, such as a "Debug Hint" field that may include a byte from the corresponding instruction to identify possible instruction buffer corruption. Notification packet 900 may include a "Program Counter" field that may indicate the value of the program counter of the instruction buffer associated with the instruction. Notification packet 900 may also include two hardware-generated metadata fields, "Metadata_1" field and "Metadata_2" field. In some embodiments, each of the two hardware-generated metadata fields may include an error detection code (e.g., cyclic redundancy check (CRC) bits) generated for the input data or output data associated with the instruction. Notification packet 900 may include a 64-bit timestamp that indicates the time associated with the execution of the instruction. For example, the timestamp may indicate the starting or completion time of the instruction as described above, which may be represented by the total number of clock cycles at the starting or completion time of the instruction since a reference time point (e.g., a reset of a clock counter or a start of an inference).

In some embodiments, the debugging circuits may include one or more registers for configuring the debugging circuits. For example, one or more control and status registers (CSRs) may be added to control the operations of the debugging circuits and indicate statuses of the debugging circuits. The debugging circuits may be set to different debug levels, where the debug levels may determine whether and when the debug output may be generated for the instructions. The debug levels may be set by configuring corresponding bits in the CSRs.

In some applications, a debugging circuit may be set to the lowest debug level, where the debugging circuit may be turned off or bypassed such that no debug output may be generated for any instructions executed by a corresponding processing engine. In some applications, the debugging circuit may be set to a debug level such that debug outputs may only be generated for selected instructions. For example, some instructions may be selected by a compiler and identified as instructions for which debug outputs may be generated. In some applications, a debugging circuit may be set to a debug level where the debug output may only be generated at the start of an instruction. In some applications, a debugging circuit may be set to a debug level where debug output may only be generated at the end of an instruction. In some applications, a debugging circuit may be set to a debug level where debug outputs may be generated at both the start and the end of an instruction. In some applications, a debugging circuit may be set to a debug level where debug outputs may be generated only for selected instructions and only at the start or the end of each selected instruction.

In some applications, a debugging circuit may be set to a debug level where the debug output may be generated based on a debug level set for each individual instruction. For example, the compiler may set the debug level for each instruction by setting a field in a header of the instruction, and the debugging circuit may read the field in the header of the instruction to determine whether no debug output may be generated for the instruction or whether the debug output may be generated at the start, at the end, or at both the start and the end of the instruction.

As described above, in neural networks, many instructions may each take multiple clock cycles (e.g., from about 64 to about 512 cycles) to complete. The average clock cycles per instruction may be on the order of 100, such as about 256 cycles. Therefore, the memory used for storing the notification packets and the bandwidth of the bus for sending the notification packets to the memory device may generally be small, and thus the performance of the processing engine would not be significantly affected. For example, if a neural network is implemented using four neural network processors (e.g., neural network processor 202) each including 3 processing engines, an instruction can be completed in about 256 clock cycles, each debug output (e.g., notification packet) includes 16 bytes, and two notifications are generated for each instruction, the bandwidth used to transmit the debug outputs is about 16 B×4×3×2÷256=1.5 B per clock cycle. If the processing engines operate at 1 GHZ per second, the bandwidth used to transmit the debug outputs is about 1.5 GB per second. Thus, adding the debugging circuits for tracking the execution of the instructions by the processing engines has minimal or negligible impact on the performance of the processing engines. In addition, for an inference that may take, for example, about 10 millisecond (such as on a ResNet-50, batch 16), the debugging circuits may only generate about 15 MB debug output data. Thus, a small memory space can be used to store the debug output data.

Figure 10:
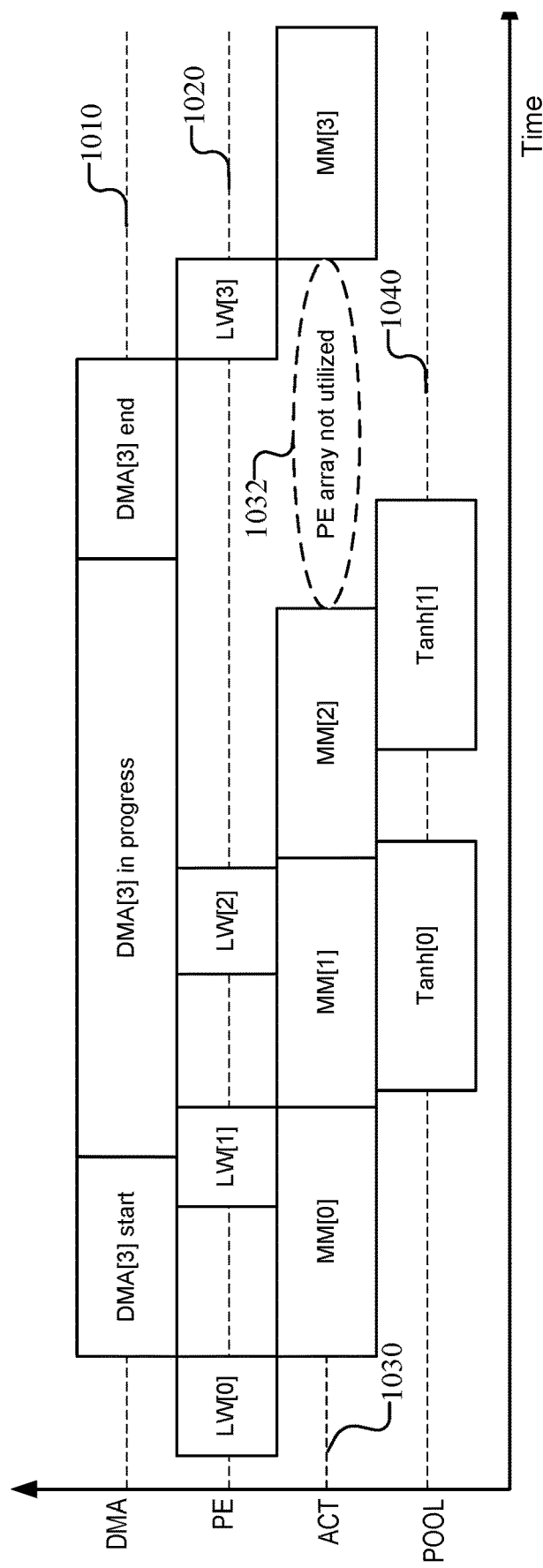
FIG. 10 illustrates examples of execution timelines of various functional blocks of a neural network generated based on some techniques disclosed herein according to certain embodiments.

FIG. 10 illustrates examples of execution timelines of various functional blocks of a neural network generated based on some techniques disclosed herein according to certain embodiments. The timelines may be generated based on the timestamps associated with the instructions executed by the functional blocks of the neural network. For example, the operations of a DMA controller of the neural network may be shown by a timeline 1010, which may indicate the DMA start time (e.g., start time of DMA[3]), the data transfer time (e.g., data transfer time of DMA[3]), and the DMA finish time (e.g., end time of DMA[3]). The loading of the weights for the neural network layers may be shown by a timeline 1020, which indicates the starting time and the end time for loading the weights for the network layers, such as an instruction LW[0] for loading the weights for a set of a convolution layer, an activation layer, and/or a pooling layer. The operation of the PE array may be shown by a timeline 1030, which may indicate the starting time and the end time of each convolution instruction, such as matrix multiplication MM[0], MM[1], MM[2], or MM[3]. The operation of the activation engine may be shown by a timeline 1040, which may indicate the starting time and the end time of each activation instruction, such as activation instruction Tan h[0] or Tan h[1]. The timelines may be aligned based on a common reference clock. Based on the timelines, the utilization rate of the functional blocks of the neural network during the operation of the neural network and the bottlenecks of the neural network may be determined. For example, during a time period 1032, the PE array may not be utilized.

Figure 11A:
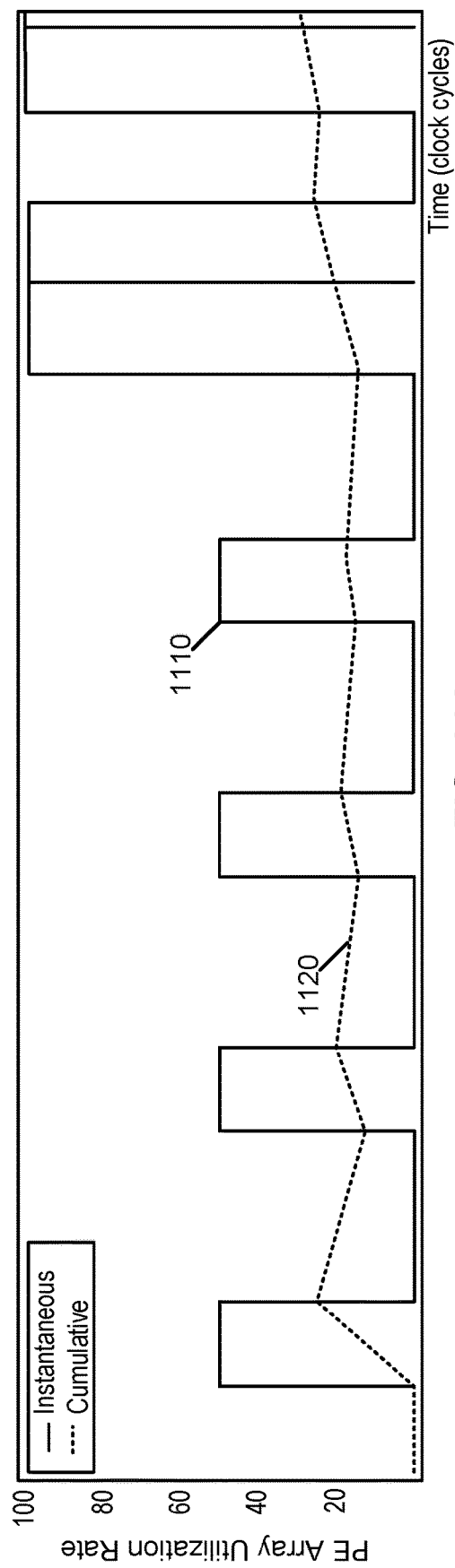
FIG. 11A illustrates examples of instantaneous and cumulative PE array utilization rates measured using some techniques disclosed herein according to certain embodiments.

FIG. 11A illustrates examples of instantaneous and cumulative PE array utilization rates measured using some techniques disclosed herein according to certain embodiments. A curve 1110 may be generated based on the saved timestamps associated with the instructions executed by a PE array. Curve 1110 may indicate the instantaneous utilization rate of the PE array as a function of time. During some time periods, the PE array may not be used at all. In some time periods, the PE array may be partially or fully utilized. A curve 1120 may indicate the cumulative average utilization rate of the PE array as a function of time. In the example shown in FIG. 11A, the overall utilization rate of the PE array may be relatively low.

Figure 11B:
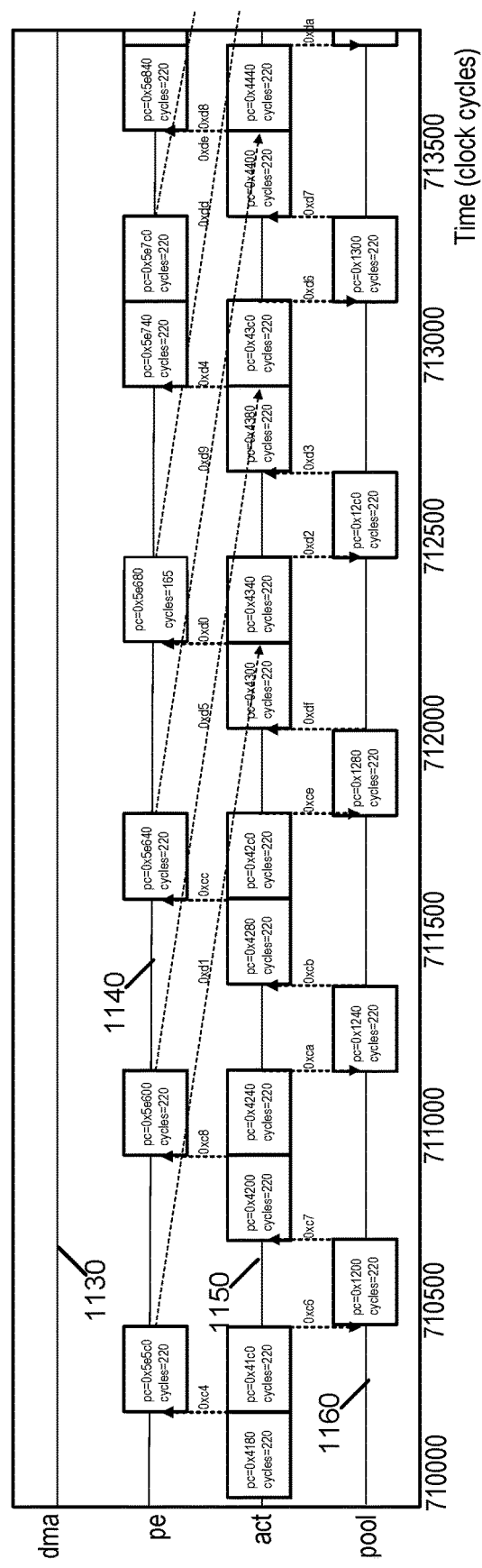
FIG. 11B illustrates examples of execution timelines of various functional blocks of a neural network determined based on some techniques disclosed herein according to certain embodiments.

FIG. 11B illustrates examples of execution timelines of various functional blocks of a neural network determined based on some techniques disclosed herein according to certain embodiments. For example, the operations of a DMA, a PE array, an activation engine, and a pooling engine during a time period may be shown by timelines 1130, 1140, 1150, and 1160, respectively. The corresponding instruction identification, program counter, and number of clock cycles for each instruction are also shown in the timelines. Timeline 1140 may correspond to curve 1110 of FIG. 11A.

Figure 12:
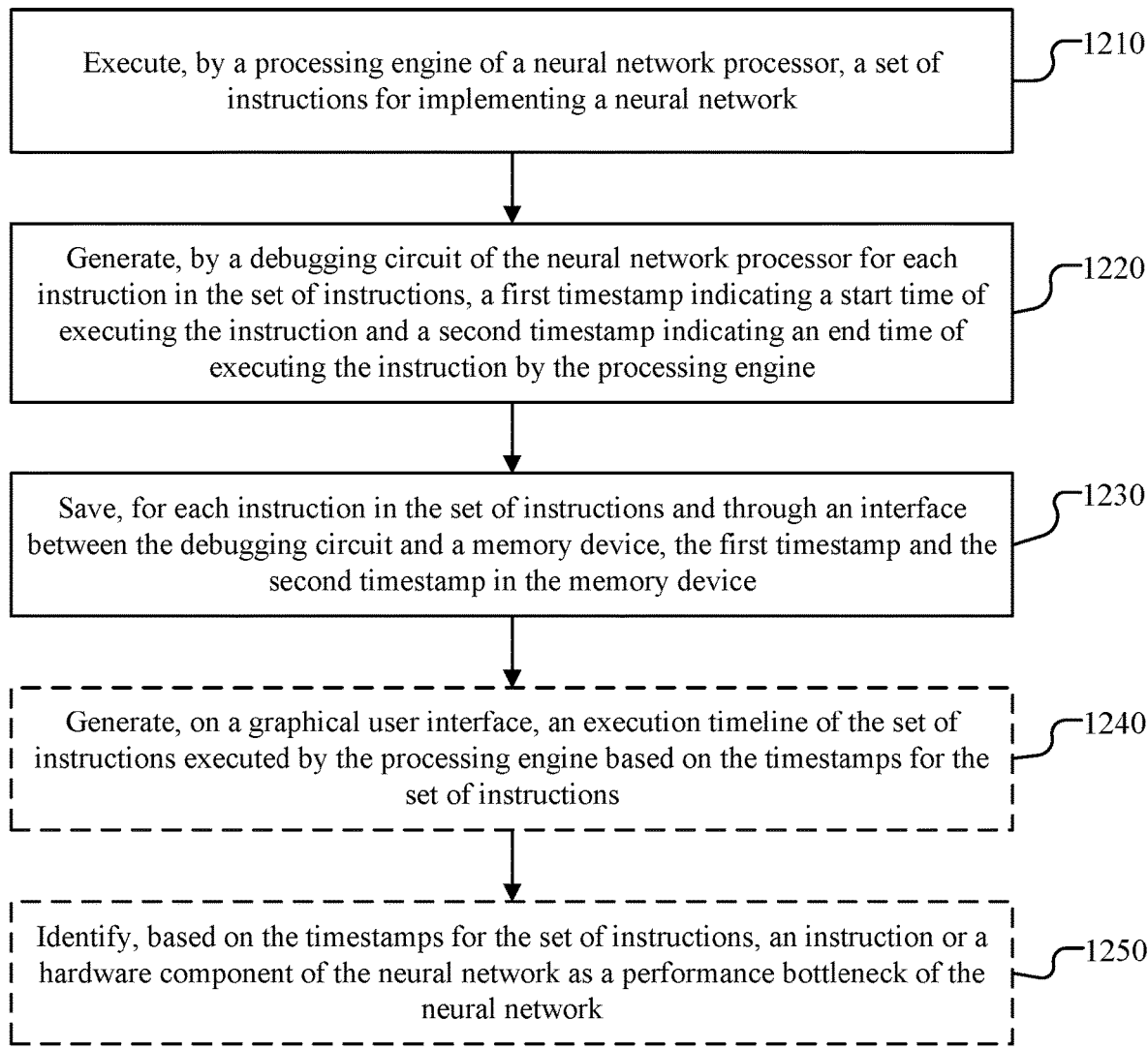
FIG. 12 is a simplified flow chart illustrating an example method for debugging a neural network according to certain embodiments.

FIG. 12 is a simplified flow chart 1200 illustrating an example method for debugging and improving the performance of a neural network according to certain embodiments. The method may be implemented by the systems described above, such as, for example, neural network processor 202 or processing engine 300.

At block 1210, a processing engine of a neural network may execute a set of instructions for implementing a neural network. The processing engine may include, for example, a convolution engine, an activation engine, a pooling engine, or a DMA engine. In some embodiments, the processing engines of the neural network may execute respective sets of instructions in multiple threads as described above.

At block 1220, a debugging circuit of the neural network processor may generate, for each instruction in the set of instructions, a first timestamp indicating a start time of executing the instruction and a second timestamp indicating an end time of executing the instruction by the processing engine. As described above, the debugging circuit can be set to different debug levels, where the debugging circuit may be configurable to generate no timestamps, generate timestamps for some but not all the instructions, generate a timestamp only at a start of an instruction, generate a timestamp only at an end of the instruction, generate timestamps at both the start of the instruction and the end of the instruction, or generate timestamps based on a value set in a field in a header of the instruction. The timestamps associated with instructions executed by other processing engine of the neural network may also be generated during the operation of the neural network.

At block 1230, the debugging circuit may save, for each instruction in the set of instructions, the first timestamp and the second timestamp in a memory device through an interface between the debugging circuit and the memory device. In some embodiments, the debugging circuit may generate a notification packet that includes the first timestamp or the second timestamp, and save the notification packet to the memory device. In some embodiments, the notification packet may also include an identification of the instruction, and an identification of the processing engine that executes the instruction.

Optionally, at block 1240, an execution timeline of the set of instructions executed by the processing engine may be generate on a graphic user interface based on the timestamps for the set of instructions. Multiple execution timelines may be generated for multiple sets of instructions executed by multiple processing engines of the neural network. In some embodiments, the utilization rate (e.g., instantaneous utilization rate or accumulated average utilization rate) of the processing engine may be determined and displayed to users through the graphic user interface.

Optionally, at block 1250, based on the timestamps for the set of instructions, an instruction or a hardware component of the neural network may be identified as a performance bottleneck of the neural network. The neural network may then be modified to improve the performance of the neural network at the identified bottleneck.

Even though FIGS. 7 and 12 describe the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 13:
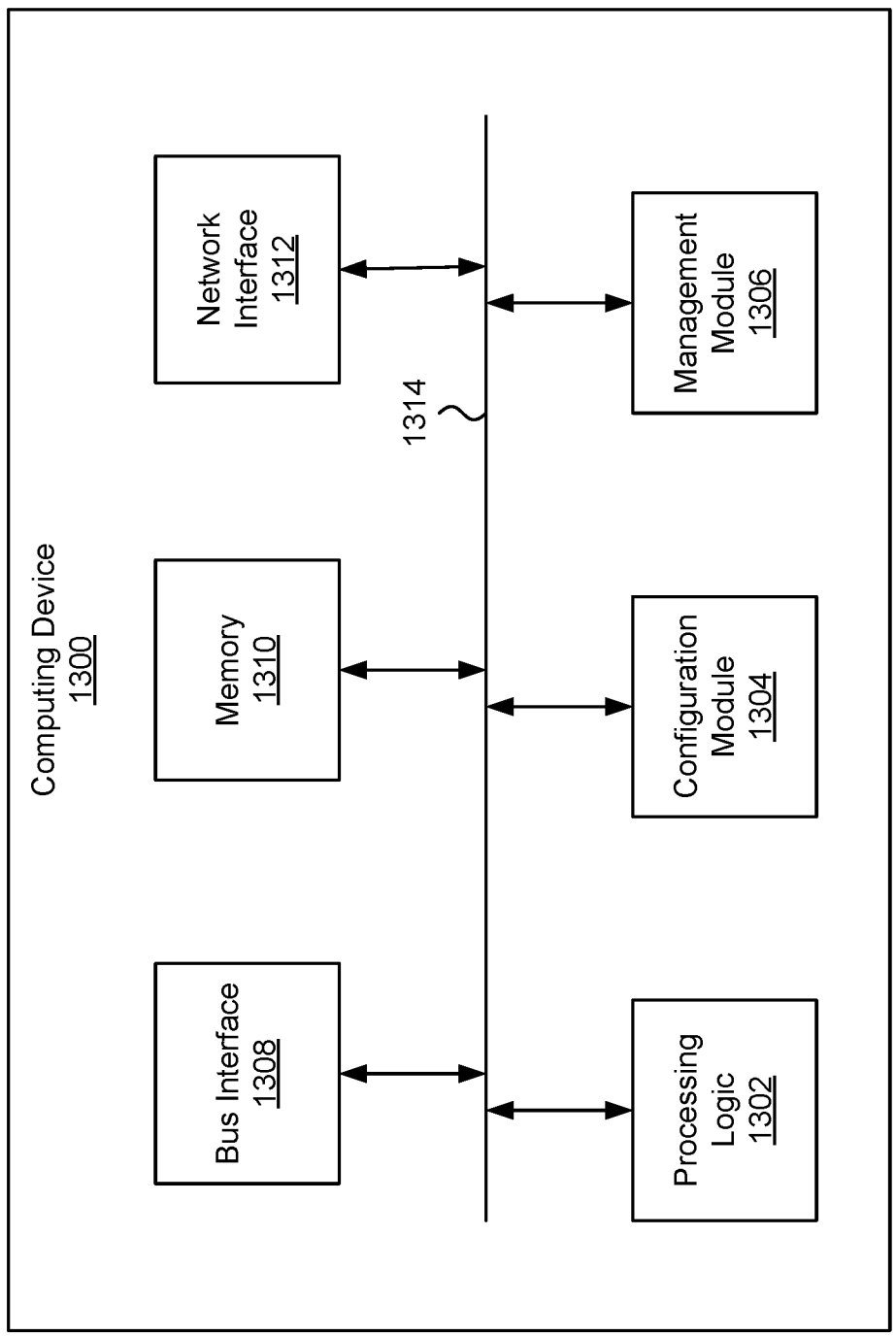
FIG. 13 illustrates an example of a computing device for implementing some of the embodiments disclosed herein.

FIG. 13 illustrates an example of a computing device 1300 for implementing some of the embodiments disclosed herein. Functionality and/or several components of the computing device 1300 may be used without limitation with other embodiments disclosed elsewhere in this disclosure, without limitations. Computing device 1300 may perform computations to facilitate processing of a task. As an illustrative example, computing device 1300 can be part of a server in a multi-tenant compute service system. Various hardware and software resources of computing device 1300 (e.g., the hardware and software resources associated with provision of an image recognition service) can be allocated to a client upon request.

In one example, the computing device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The computing device 1300 may include additional modules, not illustrated here. In some implementations, the computing device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the computing device 1300, while in other cases some or all of the memory may be external to the computing device 1300. The memory 1310 may store an operating system comprising executable instructions that, when executed by the processing logic 1302, provides the execution environment for executing instructions providing networking functionality for the computing device 1300. The memory may also store and maintain several data structures and routing tables for facilitating the functionality of the computing device 1300.

In some implementations, the configuration module 1304 may include one or more configuration registers. Configuration registers may control the operations of the computing device 1300. In some implementations, one or more bits in the configuration register can represent certain capabilities of the computing device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the computing device 1300.

In some implementations, the management module 1306 may be configured to manage different components of the computing device 1300. In some cases, the management module 1306 may configure one or more bits in one or more configuration registers at power up, to enable or disable certain capabilities of the computing device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the computing device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1300 may include multiple network interface modules, each configured to communicate with a different network. For example, in these implementations, the computing device 1300 may include a network interface module for communicating with a wired Ethernet network, a wireless 802.11 network, a cellular network, an Infiniband network, etc.

The various components and modules of the computing device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
   generating, by a compiler based on a model of a neural network, executable instructions to be executed in multiple threads by processing engines in a semiconductor device to implement the neural network;
   executing, by the processing engines, the executable instructions in the multiple threads;
   for each instruction in a set of the executable instructions:
   determining, by a debugging circuit of the neural network, a first timestamp indicating a start time of executing the instruction and a second timestamp indicating an end time of executing the instruction by a corresponding processing engine; and saving the first timestamp and the second timestamp in a memory device; and identifying, based on the first timestamp and the second timestamp for each instruction in the set of the executable instructions, an instruction in the set of instructions or a hardware component of the neural network as a performance bottleneck of the neural network.

2. The computer-implemented method of claim 1, wherein saving the first timestamp and the second timestamp in the memory device includes:

generating a notification packet for the first timestamp and a notification packet for the second time stamp; and saving the notification packets for the first timestamp and the second timestamp in the memory device, wherein each notification packet includes:
the first timestamp or the second timestamp; and
at least one of:
an identification of the instruction;
an identification of the corresponding processing engine;
a program counter;
software-generated metadata; or
hardware-generated metadata.

3. The computer-implemented method of claim 1, wherein:
the debugging circuit of the neural network is configurable to generate timestamps according to a set of debug levels; and
the computer-implemented method further comprises setting a debug level for the debugging circuit from the set of debug levels.

4. The computer-implemented method of claim 1, further comprising:
generating, on a graphical user interface, execution timelines of the set of instructions executed by corresponding processing engines,
wherein each execution timeline corresponds to instructions executed by a processing engine.

5. A neural network processor comprising: a processing engine configured to execute instructions for implementing a neural network; a debugging circuit coupled to the processing engine of the neural network, wherein the debugging circuit is configurable to determine, for each instruction in a set of instructions, a first timestamp indicating a start time of executing the instruction and a second timestamp indicating an end time of executing the instruction by the processing engine; and an interface to a memory device, wherein the interface is configured to save the first timestamp and the second timestamp for each instruction in the set of instructions into the memory device.

6. The neural network processor of claim 5, further comprising a control register,
wherein the debugging circuit is configurable to operate at a debug level from a set of debug levels based on a value in the control register.

7. The neural network processor of claim 6, wherein, at the debug level, the debugging circuit is configured to be bypassed for all instructions executed by the processing engine.

8. The neural network processor of claim 6, wherein, at the debug level, the debugging circuit is configured to determine timestamps for some, but not all instructions executed by the processing engine.

9. The neural network processor of claim 6, wherein, at the debug level, the debugging circuit is configured to determine, for each instruction in the set of instructions, only one timestamp indicating a start time or an end time of executing the instruction.

10. The neural network processor of claim 6, wherein, at the debug level, the debugging circuit is configured to generate timestamps for the set of instructions based on a value set in a field in a header of each respective instruction.

11. The neural network processor of claim 10, wherein the value set in the field of the header of an instruction includes:
a value indicating that no timestamp is to be generated for the instruction;
a value indicating that a start time of executing the instruction is to be determined;
a value indicating that an end time of executing the instruction is to be determined; or
a value indicating that a start time and an end time of executing the instruction are to be determined.

12. The neural network processor of claim 10, wherein the value set in the field of the header of each respective instruction is determined by a compiler while compiling a model of the neural network.

13. The neural network processor of claim 5, wherein:
the debugging circuit is further configurable to generate a notification packet for the first timestamp and a notification packet for the second timestamp, each notification packet including:
the first timestamp or the second timestamp; and
at least one of:
an identification of the instruction;
an identification of the processing engine;
a program counter;
software-generated metadata; or
hardware-generated metadata.

14. The neural network processor of claim 5, further comprising:
a second processing engine, wherein the processing engine and the second processing engine are configured to execute the instructions for implementing the neural network in respective threads;
a second debugging circuit coupled to the second processing engine, wherein the second debugging circuit is configurable to determine, for each instruction in a second set of instructions, a third timestamp indicating a start time of executing the instruction and a fourth timestamp indicating an end time of executing the instruction by the second processing engine; and
a second interface to the memory device, wherein the second interface is configured to save the third timestamp and the fourth timestamp for each instruction in the second set of instructions into the memory device.

15. The neural network processor of claim 14, wherein:
the processing engine and the second processing engine are synchronized; or
the first timestamp, second timestamp, third timestamp, and fourth timestamp are based on a same reference clock.

16. A computer-implemented method, comprising:
executing, by a processing engine of a neural network processor, a set of instructions for implementing a neural network;
for each instruction in the set of instructions:
generating, by a debugging circuit of the neural network processor, a first timestamp indicating a start time of executing the instruction and a second timestamp indicating an end time of executing the instruction by the processing engine; and saving, through an interface between the debugging circuit and a memory device, the first timestamp and the second timestamp in the memory device.

17. The computer-implemented method of claim 16, further comprising:

setting a debug level of the debugging circuit through a control register.

18. The computer-implemented method of claim 16, further comprising:

generating, on a graphical user interface, an execution timeline of the set of instructions executed by the processing engine based on the first timestamp and the second timestamp for each instruction in the set of instructions.

19. The computer-implemented method of claim 16, further comprising:

identifying, based on the first timestamp and the second timestamp for each instruction in the set of instructions, an instruction or a hardware component of the neural network as a performance bottleneck of the neural network.

20. The computer-implemented method of claim 16, further comprising:

executing, by a second processing engine of the neural network processor, a second set of instructions for implementing the neural network, wherein the processing engine and the second processing engine execute the set of instructions and the second set of instructions in multiple threads;

for each instruction in the second set of instructions:

generating, by a second debugging circuit of the neural network processor and, a third timestamp indicating a start time of executing the instruction and a fourth timestamp indicating an end time of executing the instruction by the second processing engine; and saving, through a second interface between the second debugging circuit and the memory device, the third timestamp and the fourth timestamp in the memory device.

* * * * *